US007710372B2

(12) United States Patent
Hirakawa et al.

(10) Patent No.: US 7,710,372 B2
(45) Date of Patent: May 4, 2010

(54) PDP DATA DRIVER, PDP DRIVING METHOD, PLASMA DISPLAY DEVICE, AND CONTROL METHOD FOR THE SAME

(75) Inventors: Shinji Hirakawa, Tokyo (JP); Kazunari Takasugi, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1317 days.

(21) Appl. No.: 11/188,102

(22) Filed: Jul. 25, 2005

(65) Prior Publication Data

US 2006/0017660 A1 Jan. 26, 2006

(30) Foreign Application Priority Data

Jul. 26, 2004 (JP) ............................ 2004-217645

(51) Int. Cl.
*G09G 3/28* (2006.01)
*G09G 5/00* (2006.01)
*G06F 3/038* (2006.01)

(52) U.S. Cl. ............................ 345/87; 345/60; 345/61; 345/204

(58) Field of Classification Search ............ 345/60–72, 345/204; 315/111.21–111.71; 313/231.31–231.61
See application file for complete search history.

(56) References Cited

U.S. PATENT DOCUMENTS

2003/0193453 A1* 10/2003 Mizobata .................... 345/60
2004/0021622 A1* 2/2004 Nagao et al. .................. 345/60

FOREIGN PATENT DOCUMENTS

JP 11-109917 4/1999

OTHER PUBLICATIONS

"Paper Machine" Technical document for sales promotion purpose. NEC Corporation. Mar. 2001. pp. 1-14, plus English translation of p. 1 and p. 5.

* cited by examiner

*Primary Examiner*—Alexander S Beck
(74) *Attorney, Agent, or Firm*—Drinker Biddle & Reath LLP

(57) ABSTRACT

A PDP data driver is provided in which input and output terminals are divided into a plurality of groups and a given group can be selected so as to output a high level. The PDP data driver is formed by a plurality of data driver ICs that are arranged. In an output control circuit of each data driver IC, input and output terminals are arranged in an order of a plurality of primary colors forming a screen and are divided into a plurality of groups. The output control circuit includes a first gate array and a second gate array in such a manner that gates of each array corresponds to the input and output terminals, respectively. For each of the groups, the first gate array is controlled to output input data without change or output a high level in accordance with a first control input and the second gate array is controlled to transfer all outputs of the first gate array without change or output a low level in accordance with a second control output.

6 Claims, 21 Drawing Sheets

FIG. 10

| HBLK1 | HBLK2 | HBLK3 | LBLK | OUT(3n-2) | OUT(3n-1) | OUT3n |
|---|---|---|---|---|---|---|
| H | H | H | H | IDATA(3n-2) | IDATA(3n-1) | IDATA3n |
| L | X | X | H | HIGH-BLANK | IDATA(3n-1) | IDATA3n |
| X | L | X | H | IDATA(3n-2) | HIGH-BLANK | IDATA3n |
| X | X | L | H | IDATA(3n-2) | IDATA(3n-1) | HIGH-BLANK |
| H | H | H | L | LOW-BLANK | LOW-BLANK | LOW-BLANK |

FIG. 16

| HBLK1 | LBLK1 | OUT(3n-2) |
|---|---|---|
| H | H | IDATA(3n-2) |
| L | H | HIGH-BLANK |
| H | L | LOW-BLANK |

| HBLK2 | LBLK2 | OUT(3n-1) |
|---|---|---|
| H | H | IDATA(3n-1) |
| L | H | HIGH-BLANK |
| H | L | LOW-BLANK |

| HBLK3 | LBLK3 | OUT3n |
|---|---|---|
| H | H | IDATA3n |
| L | H | HIGH-BLANK |
| H | L | LOW-BLANK |

PDP DATA DRIVER, PDP DRIVING METHOD, PLASMA DISPLAY DEVICE, AND CONTROL METHOD FOR THE SAME

BACKGROUND OF THE INVENTION

1. Field of the Invention

The present invention relates to a data driver for a plasma display panel (PDP), a driving method for a PDP, and a plasma display device using them, and a control method for the plasma display device.

2. Description of the Related Art

A plasma display panel (hereinafter, simply referred to as PDP) has many features. In general, the PDP is thin and flicker-free, has a large display contrast ratio and a high response speed, and can be relatively easily manufactured to have a large screen, for example. Moreover, the PDP is self-luminous and can emit multiple colors of light in accordance with selection of fluorescent materials.

Owing to these features, the PDP has been widely used in the arts of computer-related displays, home-use thin TV receivers, and the like in recent years.

PDPs are classified into an alternating-current (AC) discharge type and a direct-current (DC) discharge type according to an operating method. In the AC discharge type, electrodes are covered with a dielectric material and are indirectly operated in a state where AC discharge occurs. In the DC discharge type, electrodes are exposed to a discharge space and are operated in a state where DC discharge occurs.

The AC discharge type is further classified into a memory operation type and a refresh operation type in accordance with a driving method. The memory operation type uses a memory function of a discharge cell, whereas the refresh operation type does not use the memory function.

In the refresh operation type, the brightness is lowered with increase of the display capacity. Thus, the refresh operation type is typically used in a small PDP having a small display capacity. A PDP used in a thin TV receiver in recent years is usually the AC discharge memory operation type.

FIG. 1 is a cross-sectional view showing the structure of a display cell in a typical AC discharge memory operation type PDP.

As shown in FIG. 1, each display cell of the AC discharge memory operation type PDP generally includes a rear insulating substrate 1 made of glass; a front insulating substrate 2 made of glass; a transparent scanning electrode 3 formed on the front insulating substrate 2; a transparent sustain electrode 4 that is also formed on the front insulating substrate 2; a trace electrode 5 arranged to overlap the scanning electrode 3; a trace electrode 6 arranged to overlap the sustain electrode 4; a data electrode 7 formed on the rear insulating substrate 1 to perpendicularly intersect with the scanning electrode 3 and the sustain electrode 4; a discharge gas space 8 filled with a discharge gas formed of a gas of helium (He), neon (Ne), xenon (Xe), or the like, or a mixed gas of them; barriers 9 for ensuring the discharge gas space 8 and sectioning the display cell; a fluorescent material 11 that converts ultra-violet rays generated by discharge of the discharge gas into visible light 10; a dielectric layer 12 covering the scanning electrode 3 and the sustain electrode 4; a protection layer 13 for protecting the dielectric layer 12 against discharge, formed of magnesium oxide (MgO) or the like; and a dielectric layer 14 covering the data electrode 7.

A discharge operation of a selected display cell is now described with reference to FIG. 1.

When a pulse voltage larger than a discharge threshold value is applied across the scanning electrode 3 and the data electrode 7 so as to start discharge, positive and negative electric charges are attracted to surfaces of the dielectric layers 12 and 14 in accordance with a polarity of the pulse voltage, and are accumulated. A wall voltage that is an equivalent internal voltage caused by the accumulation of electric charges has an opposite polarity to that of the pulse voltage. Thus, an effective voltage within the display cell is lowered with growth of discharge and therefore discharge cannot be held even if the applied pulse voltage is kept to a constant value. Finally, discharge stops.

Then, when a sustain pulse that is a pulse voltage having the same polarity as that of the wall voltage is applied across the scanning electrode 3 and the sustain electrode 4 that are adjacent to each other, the wall voltage is added as the effective voltage to the sustain pulse and a total voltage exceeds the discharge threshold value. Thus, even if the amplitude of the sustain pulse is small, discharge occurs. Therefore, it is possible to hold discharge by continuously applying the sustain pulse across the scanning electrode 3 and the sustain electrode 4.

The above function is a memory function of a discharge cell. The sustain discharge can be stopped by applying a low voltage pulse that has a wide pulse-width and can neutralize the wall voltage, a narrow erasing pulse that is a pulse with approximately the same voltage as the narrow pulse-width sustain pulse, or a gentle pulse in which transition occurs at a rate of several volts per microsecond to the scanning electrode 3 or the sustain electrode 4.

Next, a structure of a conventional PDP driving device is described with reference to FIG. 2. FIG. 2 is a block diagram of an example of the conventional PDP driving device.

A PDP 21 is provided with a group of sustain electrodes 42 and a group of scanning electrodes 53 on one surface. The sustain electrodes 42 and the scanning electrodes 53 are arranged to be parallel to each other. The PDP 21 is also provided with a group of data electrodes 32 on a surface opposed to the above surface. The data electrodes 32 are arranged to intersect with the sustain electrodes 42 and the scanning electrodes 53 perpendicularly. A display cell 22 is formed at each of intersections of the sustain electrodes and scanning electrodes and the data electrodes. A sustain electrode X is provided to correspond to each of the scanning electrodes Y1, Y2, Y3, . . . , and Yn (n is a given positive integer) near the corresponding scanning electrode. The sustain electrodes X are connected at their one ends in common with each other.

A plurality of kinds of driver circuits that are required for driving the display cell 22 and a control circuit for controlling those driver circuits in the conventional PDP driving device are now described.

A data driver 31 that supplies data to a group of data electrodes 32 for one line so as to drive those data electrodes is provided in order to cause address discharge of the display cell 22. Moreover, a sustain driver circuit 40 that makes the sustain electrode group 42 commonly perform sustain discharge and a scanning driver circuit 50 that makes the scanning electrode group 53 commonly perform sustain discharge are provided in order to cause sustain discharge in the display cell 22.

In addition, a scanning driver 55 that sequentially scans the scanning electrode group 53 including the scanning electrodes Y1 to Yn is provided in order to cause discharge for selection and writing during an address period. The scanning driver 55 also applies a sustain pulse to its own electric supply source, thereby causing sustain discharge.

A control circuit 61 controls all operations of the data driver 31, the sustain driver circuit 40, the scanning driver circuit 50, the scanning driver 55, and the PDP 21.

A main part of the control circuit 61 is formed by a display data controller 62 and a driving timing controller 63. The display data controller 62 has a function of re-ordering display data input from the outside into data for driving the PDP 21. The display data controller 62 also has a function of temporarily storing a sequence of the re-ordered display data and transferring that sequence to the data driver 31 as display data DATA in synchronization with sequential scanning by the scanning driver 55 during address discharge. The driving timing controller 63 converts various signals such as a dot clock that are input from the outside into internal control signals for driving the PDP 21, thereby controlling the respective drivers and driver circuits.

Next, a driving sequence in the conventional PDP driving device is described with reference to FIG. 3. FIG. 3 is a time chart showing a state in which a plurality of sub-fields are formed within one field in the conventional PDP driving device.

The sub-fields (hereinafter, simply referred to as SFs) are formed by dividing one field having duration of 16.7 ms, for example, to have different weights from each other. In the example of FIG. 3, the number of the sub-fields is set to 8. The driving sequence is defined by combining those sub-fields in an appropriate manner so as to present 256 gray-scales.

Each sub-field is formed by a scanning period and a sustain discharge period. During the scanning period, display data in accordance with the weight of that sub-field is written. During the sustain discharge period, the display data for which writing has been instructed is displayed. An image of one field is displayed by combining the respective sub-fields.

FIG. 4 shows a detailed operation in one sub-field having a certain weight. FIG. 4 shows a sustain electrode driving waveform Wx that is commonly applied to the sustain electrodes X, scanning electrode driving waveforms Wy1 to Wyn that are applied to the scanning electrodes Y1 to Yn, respectively, and data electrode driving waveforms Wdi (1=i=k) that are applied to the data electrodes D1 to Dk, respectively.

One period of the sub-field is formed by the scanning period and the sustain discharge period. The scanning period is formed by a preliminary discharge period and a writing discharge period. A desired picture can be displayed by repeating those periods. The preliminary discharge period is used, if necessary, and it can be omitted.

The preliminary discharge period is a period for generating active particles and wall charges in the discharge gas space in order to make stable writing discharge occur during the writing discharge period. The preliminary discharge period is formed by a preliminary discharge pulse for causing discharge in all display cells of the PDP at the same time and a preliminary discharge erasing pulse for erasing ones of the wall charges generated by application of the preliminary discharge pulse, which obstruct writing discharge and sustain discharge.

During the sustain discharge period, sustain discharge is caused by utilizing a memory operation so as to emit light, in order to achieve desired brightness in a display cell in which writing discharge has been performed during the writing discharge period.

During the preliminary discharge period, first, a preliminary discharge pulse Pp is applied to the sustain electrodes X so as to make discharge occur in all the display cells. Then, a preliminary discharge erasing pulse Ppe is applied to the scanning electrodes Y1 to Yn to make erasing discharge occur, so that the wall charges accumulated by the preliminary discharge pulse are erased.

During the following writing discharge period, a scanning pulse Pw is sequentially applied to the scanning electrodes Y1 to Yn line by line, and a data pulse Pd is selectively applied to the data electrodes Di (1=i=k) in accordance with picture display data. Thus, writing discharge is made to occur in a cell that is to perform display and wall charges are generated.

During the following sustain discharge period, sustain discharge is made to continuously occur only in the display cell in which writing discharge occurred by sustain pulses Pc and Ps. After final sustain discharge is caused by a final sustain pulse Pce, the wall charges that are formed are erased by a sustain discharge erasing pulse Pse, thereby stopping sustain discharge and completing a light-emitting operation for one screen.

The brightness of the PDP is in proportion to the number of discharges, i.e., the number of repetition of the pulse voltage in a unit time.

Next, an operation of an address driver circuit for causing address discharge in the conventional PDP is described in more detail.

In general, the data driver 31 shown in FIG. 2 is formed by a plurality of PDP data driver ICs each having several tens to several hundreds of display data output terminals.

The PDP data driver IC (hereinafter, simply referred to as data driver IC) has a function of outputting a data pulse to a PDP in accordance with display data. In general, the data driver IC has several tens to several hundreds of terminals for outputting a data pulse. The data pulse is binary, i.e., has a high level and a low level.

The data driver IC generally includes a shift register 101, a latch circuit 102, an output control circuit 103, and a highly tolerant buffer 104, as shown in FIG. 5.

The shift register 101 has a function of transferring and holding display data DATA 105 input from one or more display data input terminals by using a clock CLK 106. The latch circuit 102 is formed by a register and has a function of taking in the display data stored in the shift register 101 by a latch signal from a latch input terminal LE 107 and holding the display data. The display data taken in the latch circuit 102 is output from output terminals 108 as data pulses through the output control circuit 103 and the highly tolerant buffer 104.

In general, the output control circuit 103 includes a high-blank control terminal HBLK 109 to which a high blanking signal for setting all data pulse outputs of the data driver IC to a high level (hereinafter, called as a high-blank state) is input, and a low-blank control terminal LBLK 110 to which a low blanking signal for setting all the data pulse outputs to a low level (hereinafter, called as a low-blank state) is input. Please note that each data driver IC is provided with one high-blank control terminal HBLK 109 and one low-blank control terminal LBLK 110 only, because both of those control terminals are used for controlling all the data pulse outputs at the same time.

The output control circuit 103 and the highly tolerant buffer 104 in the data driver IC have structures shown in FIG. 6, for example.

The output control circuit 103 includes an array of buffers Ba1, Ba2, Ba3, . . . , Ba(n−2), Ba(n−1), and Ban, an array of gates Ga1, Ga2, Ga3, . . . , Ga(n−2), Ga(n−1), and Gan that are formed by NAND circuits, respectively, and an array of gates Gb1, Gb2, Gb3, . . . , Gb(n−2), Gb(n−1), and Gbn that are formed by NAND circuits, respectively, as shown in FIG. 6.

All the NAND gates forming the gates Ga1, Ga2, Ga3, . . . , Ga(n−2), Ga(n−1), and Gan are connected at one inputs to input data IDATA1, IDATA2, IDATA3, . . . , IDATA(n−2), IDATA(n−1), and IDATAn through the buffers Ba1, Ba2, Ba3, . . . , Ba(n−2), Ba(n−1), and Ban provided in the former stage, respectively, and are connected at the other inputs to the high-blank control terminal HBLK in parallel.

All the NAND gates forming the gates Gb1, Gb2, Gb3, . . . , Gb(n−2), Gb(n−1), and Gbn are connected at one inputs to outputs of the gates Ga1, Ga2, Ga3, . . . , Ga(n−2), Ga(n−1), and Gan provided in the former stage, respectively, and are connected at the other inputs to the low-blank control terminal LBLK in parallel.

The highly tolerant buffer 104 is formed by buffer circuits Bb1, . . . , and Bbn each of which is tolerant of a high voltage and is connected between a high voltage power source and ground. The buffer circuits Bb1, . . . , and Bbn are connected at inputs to the gates Gb1, Gb2, Gb3, Gb(n−2), Gb(n−1), and Gbn provided in the former stage, and are connected at outputs to output terminals OUT1, OUT2, OUT3, . . . , OUT(n−2), OUT(n−1), and OUTn, respectively.

In the circuit shown in FIG. 6, both the high-blank control terminal HBLK and the low-blank control terminal LBLK are low active. Thus, when those control terminals HBLK and LBLK are high, the display data IDATA1 to IDATAn input from the latch circuit provided in the former stage are output without change. When only the high-blank control terminal HBLK is set to be active (low), all outputs become high (i.e., the high-blank state) irrespective of the input data. When the low-blank control terminal LBLK is set to be active (low), all the outputs become low (i.e., the low-blank state) irrespective of the input data.

In the high-blank state, a voltage between the data electrode and the scanning electrode is lowered because the data electrode is placed at a high level (e.g., about 80V). Thus, opposed discharge between the data electrode and the scanning electrode is controlled to be stopped. In the low-blank state, application of the data pulse to the data electrodes is forcedly stopped.

Such a data driver IC is described in NEC Paper Machine: μPD16373, published by NEC Corporation, General-purpose device division, Sales and technical support group, March, 2001, p. 5, Truth table 3 (Driver) and so on, for example. This publication describes control for setting the output voltage of the data driver to a high level, a low level, or high impedance, whereas the present invention is intended to achieve control for setting the output voltage to a high level and a low level only.

FIG. 7 shows typical connection between the data driver IC and the PDP.

As shown in FIG. 7, the PDP 21 includes data electrodes for each of cells displaying red, cells displaying green, and cells displaying blue (hereinafter, red, green, and blue are referred to as R, G, and B, respectively) and are arranged in the order of the R cells, the G cells, and the B cells. Output terminals of the data driver IC are connected to the thus arranged data electrodes, respectively.

In the PDP 21, a cell that is to perform display is selected by applying a data pulse to the data electrode in the aforementioned manner during the address period. In the selection of the cell, the control circuit 61 inputs the display data DATA, the clock CLK, the latch signal, the high blanking signal, the low blanking signal and the like to corresponding input terminals of each data driver IC, so that the data driver 31 outputs the data pulse to the PDP 21.

A PDP is formed by R, G, and B cells. In each cell, a fluorescent material of any one of R, G, and B is applied. The R, G, and B fluorescent materials have different properties and therefore voltage characteristics of a cell may be different between R, G, and B.

When a difference of the voltage characteristics between the colors is large, improper lighting occurs while a display is performed, thus degrading the display quality. Moreover, a required panel driving voltage becomes larger. Therefore, a withstand voltage of a device in a driving circuit has to be made higher, thus increasing a product cost.

On the other hand, a component in the PDP that can drive cells of each color independently of cells of other colors is the data electrode. Thus, in order to compensate for the voltage characteristics of the respective colors, a driving method is conceivable in which a driving pulse is applied to data electrodes for each of R, G, and B independently of other colors during the respective period other than the writing period.

In this method, in the case where the PDP 21 and the data driver 31 are connected to each other in a manner shown in FIG. 7, it is necessary to input the display data to the data driver and control on and off of pulse outputs of output terminals for each color, in order to independently apply the driving pulse to the cells of each of R, G, and B.

However, it takes several microseconds to transfer the display data to the shift register of the data driver IC forming the data driver. Thus, there is a limitation that independent control for each of R, G, and B requires the above data transfer time when the pulse is switched.

As shown in FIG. 8, an independent and separate data driver may be provided for every color in order to avoid the aforementioned problem. A typical data driver IC has a function of forcedly setting all its output terminals to a high level or a low level, as described above. Thus, with this function, it is possible to apply a driving pulse to data electrodes without data transfer. In this case, control cannot be independently performed for each color in the connection shown in FIG. 7. Therefore, a data driver is independently provided for every color, as shown in FIG. 8, thereby enabling control to be independently performed for each color.

However, the connection between the PDP and the data driver IC shown in FIG. 8 has a disadvantage that is makes interconnection from the data driver 31 to the PDP 21 complicated.

In general, the data driver 31 and the PDP 21 are connected by means of a flexible printed-circuit board (hereinafter, FPC) and the like. However, when the connection shown in FIG. 8 is formed in the FPC for connecting a printed-circuit board on which the data driver IC is mounted to the PDP, it is necessary to make the size of the printed-circuit board larger or to increase the number of layers in the printed-circuit board. Therefore, the cost inevitably increases.

Especially, it is recently common to use COF (Chip On Film), TCP (Tape Carrier Package), or the like in which the data driver IC is directly mounted on the FPC in a PDP in order to reduce the cost. In this case, the interconnection shown in FIG. 8 requires mounting of at least three data driver ICs on the FPC, thus increasing the size of the FPC. Therefore, the cost increases as compared with a case in which the data driver IC is mounted on the printed-circuit board.

Moreover, it is necessary to use a double-sided FPC in order to achieve the interconnection shown in FIG. 8. However, the use of the double-sided FPC is not possible from a practical viewpoint because the double-sided FPC further increases the cost. In addition, mounting of a plurality of data driver ICs each having a reduced number of output terminals on the FPC can be considered. In this case, however, the number of the used ICs increases, thus inevitably increasing the cost.

SUMMARY OF THE INVENTION

In view of the afore-mentioned problems, it is an object of the present invention to provide a data driver for a PDP, a plasma display device using that data driver, and a control method for that plasma display device, which can compensate for a difference of voltage characteristics or the like between R, G, and B fluorescent materials in a PDP without increasing the cost.

According to a first aspect of the present invention, a plasma display panel (hereinafter, referred to as PDP) data driver for driving data electrodes of a PDP in accordance with display data comprises a plurality of data driver ICs that are sequentially arranged. Each of the data driver ICs includes an output control circuit. Input and output terminals of the output control circuit are sequentially arranged in an order of display cells of a plurality of primary colors forming a screen of the PDP and divided into a plurality of groups corresponding to the plurality of primary colors, respectively. The output control circuit includes a first array of gates and a second array of gates in such a manner that the gates of each of the first array and the second array correspond to the input and output terminals, respectively. The output control circuit controls the first array of the gates to output input data without change or to set the input data to a high level in accordance with a first control input for each of the plurality of groups. The output control circuit further controls the second array of the gates to transfer all outputs of the first array of the gates without change or to set said input data at a low level in accordance with a second control input.

According to a second aspect of the present invention, in the PDP data driver of the first aspect of the present invention, the plurality of primary colors forming the screen are red, green, and blue, and the plurality of groups are three groups corresponding to red, green, and blue, respectively.

According to a third aspect of the present invention, a PDP data driver for driving data electrodes of a PDP in accordance with display data comprises a plurality of data driver ICs that are sequentially arranged. Each of the data driver ICs includes an output control circuit. Input and output terminals of the output control circuit are arranged in an order of display cells of a plurality of primary colors forming a screen of the PDP and divided into a plurality of groups corresponding to the plurality of primary colors. The output control circuit includes a first array of gates and a second array of gates in such a manner that the gates of each of the first array and the second array correspond to the input and output terminals, respectively. The output control circuit controls the first array of the gates to output input data without change or to set the input data to a high level in accordance with a first control input for each of the plurality of groups. The output control circuit further controls the second array of the gates to transfer outputs of the corresponding first array of the gates without change or to set the input data to a low level in accordance with a second control input for each of the plurality of groups.

According to a fourth aspect of the present invention, a PDP data driver for driving data electrodes of a PDP in accordance with display data comprises a plurality of data driver ICs that are sequentially arranged. Each of the data driver ICs includes an output control circuit. Input and output terminals of the output control circuit are sequentially arranged in an order of display cells of a plurality of primary colors forming a screen of the PDP and divided into a plurality of groups corresponding to the plurality of primary colors, respectively. The output control circuit includes a first array of gates and a second array of gates in such a manner that the gates of each of the first array and the second array correspond to the input and output terminals, respectively. The output control circuit controls the first array of the gates to output input data without change or to set the input data to a high level in accordance with a first control input for a first group and to set a setting timing of the high level in accordance with a first timing adjustment input. The output control circuit controls the second array of the gates to transfer outputs of the corresponding first array of the gates without change or to set the outputs to a low level in accordance with a second control input for the first group, and to set a setting timing of the low level in accordance with the first timing adjustment input. The output control circuit controls the first array of the gates to output input data without change or to set the input data to the high level in accordance with the first control input for a second group, and to set the setting timing of the high level in accordance with a second timing adjustment input. The output control circuit controls the second array of the gates to transfer outputs of the corresponding first array of the gates without change or to set the output to the low level in accordance with the second control input for the second group, and to set the setting timing of the low level in accordance with the second timing adjustment input. The output control circuit controls the first array of the gates to output input data without change or to set the input data to the high level in accordance with the first control input for a third group, and to set the setting timing of the high level in accordance with a third timing adjustment input. The output control circuit controls the second array of the gates to transfer outputs of the corresponding first array of the gates without change or to set the output to the low level in accordance with the second control input for the third group, and to set the setting timing of the low level in accordance with the third timing adjustment input.

According to a fifth aspect of the present invention, in the PDP data driver of the third or fourth aspect of the present invention, the plurality of primary colors forming the screen are red, green, and blue, and the plurality of groups are three groups corresponding to red, green, and blue, respectively.

According to a sixth aspect of the present invention, a method for driving a PDP including the PDP data driver according to the first or second aspect of the present invention comprises: applying a preliminary discharge pulse formed by a saw-tooth wave to scanning electrodes to generate preliminary discharge between the scanning electrodes and sustain electrodes and between the scanning electrodes and data electrodes during a preliminary discharge period of the PDP; and terminating the preliminary discharge by performing control to set the data electrodes to be high for each of the plurality of groups by the PDP data driver during application of the preliminary discharge pulse, thereby controlling a termination time of the preliminary discharge for each of the plurality of primary colors.

According to a seventh aspect of the present invention, a method for driving a PDP including the PDP data driver according to any one of the third to fifth aspects of the present invention comprises performing control to set data electrodes to be low by the PDP data driver at different timings between the plurality of groups while display data is input to the data electrodes during a writing discharge period of the PDP, thereby making application timings of a data pulse to the data electrodes different between the plurality of groups.

According to an eighth aspect of the present invention, a plasma display device comprises: a PDP including a first substrate including a plurality of electrode pairs of a scanning electrode and a sustain electrode that are parallel to each other and a second substrate arranged to be opposed to the first substrate, the second substrate including a plurality of data electrodes arranged to intersect with the electrode pairs perpendicularly; a digital signal processing circuit for processing digital image information obtained by performing format conversion for an analog picture signal, and outputting a signal for driving the PDP; a control circuit; and a power source circuit, wherein the electrode pairs and the data electrodes are driven by driving circuits to make display cells formed between the first and second substrates at respective intersections of the electrode pairs and the data electrodes emit light, and the driving circuit for driving the data electrodes is formed by the PDP data driver according to any one of the first to fifth aspects of the present invention.

According to a ninth aspect of the present invention, a plasma display device comprises: a PDP including a first substrate including a plurality of electrode pairs of a scanning electrode and a sustain electrode that are parallel to each other and a second substrate arranged to be opposed to the first substrate, the second substrate having a plurality of data electrodes arranged to intersect with the electrode pairs perpendicularly; a digital signal processing circuit for processing digital image information obtained by performing format conversion for an analog picture signal, and outputting a signal for driving the PDP; a control circuit; and a power source circuit, wherein the electrode pairs and the data electrodes are driven by driving circuits to make display cells formed between the first and second substrates at respective intersections of the electrode pairs and the data electrodes emit light, and the PDP is driven by the driving method according to the sixth or seventh aspect of the present invention.

According to the present invention, a PDP data driver is formed by a plurality of data driver ICs that are arranged. In an output control circuit of each data driver IC, input and output terminals are arranged in an order of a plurality of primary colors forming a screen and are divided into a plurality of groups. For each of the groups, control is performed for the output control circuit to output input data without change or output a high level in accordance with a control input. Thus, it is not necessary to independently provide a data driver for each color. That is, without making interconnection between the data driver ICs and the PDP complicated, it is possible to terminate preliminary discharge of the PDP by performing control for data electrodes of each group to set the data electrodes to be high while a preliminary discharge pulse is applied during a preliminary discharge period. Therefore, it is possible to control a termination time of preliminary discharge for every primary color.

Moreover, according to the present invention, a PDP data driver is formed by a plurality of data driver ICs that are arranged. In an output control circuit of each data driver IC, input and output terminals are arranged in an order of a plurality of primary colors forming a screen and are divided into a plurality of groups. For each of the groups, control is performed for the output control circuit to output input data without change or output a high level and control is performed to output the input data without change or output a low level. Thus, it is not necessary to provide an independent data driver for every color. That is, without making interconnection between the data driver ID and a PDP complicated, it is possible to control a termination time of preliminary discharge of the PDP for every color by performing control for each group to set data electrodes to be high while a preliminary discharge pulse is applied so as to terminate preliminary discharge. It is also possible to perform control to make application timings of a data pulse to the data electrodes different between the groups by performing control for setting the data electrodes to be low at different timings between the groups while display data is input to the data electrodes.

A PDP data driver that drives data electrodes of a PDP in accordance with display data is formed by a plurality of data driver ICs that are arranged. In an output control circuit of each data driver IC, input and output terminals are arranged in an order of a plurality of primary colors forming a screen and are divided into a plurality of groups. The output control circuit includes a first array of gates and a second array of gates in such a manner that the gates of each array correspond to the input terminals and the output terminals, respectively. For each of the groups, the gates of the first array are controlled to output input data without change or output a high level in accordance with a first control input, and the gates of the second array are controlled to transfer all outputs of the gates of the first array without change or output a low level in accordance with a second control input.

BRIEF DESCRIPTION OF THE DRAWINGS

FIG. 10 shows a truth table of the output control circuit and the highly tolerant buffer in the PDP data driver IC in the first embodiment of the present invention;

FIG. 16 shows a truth table of the output control circuit and the highly tolerant buffer in the PDP data driver IC in the second embodiment of the present invention;

DETAILED DESCRIPTION OF THE INVENTION

Figure 9:
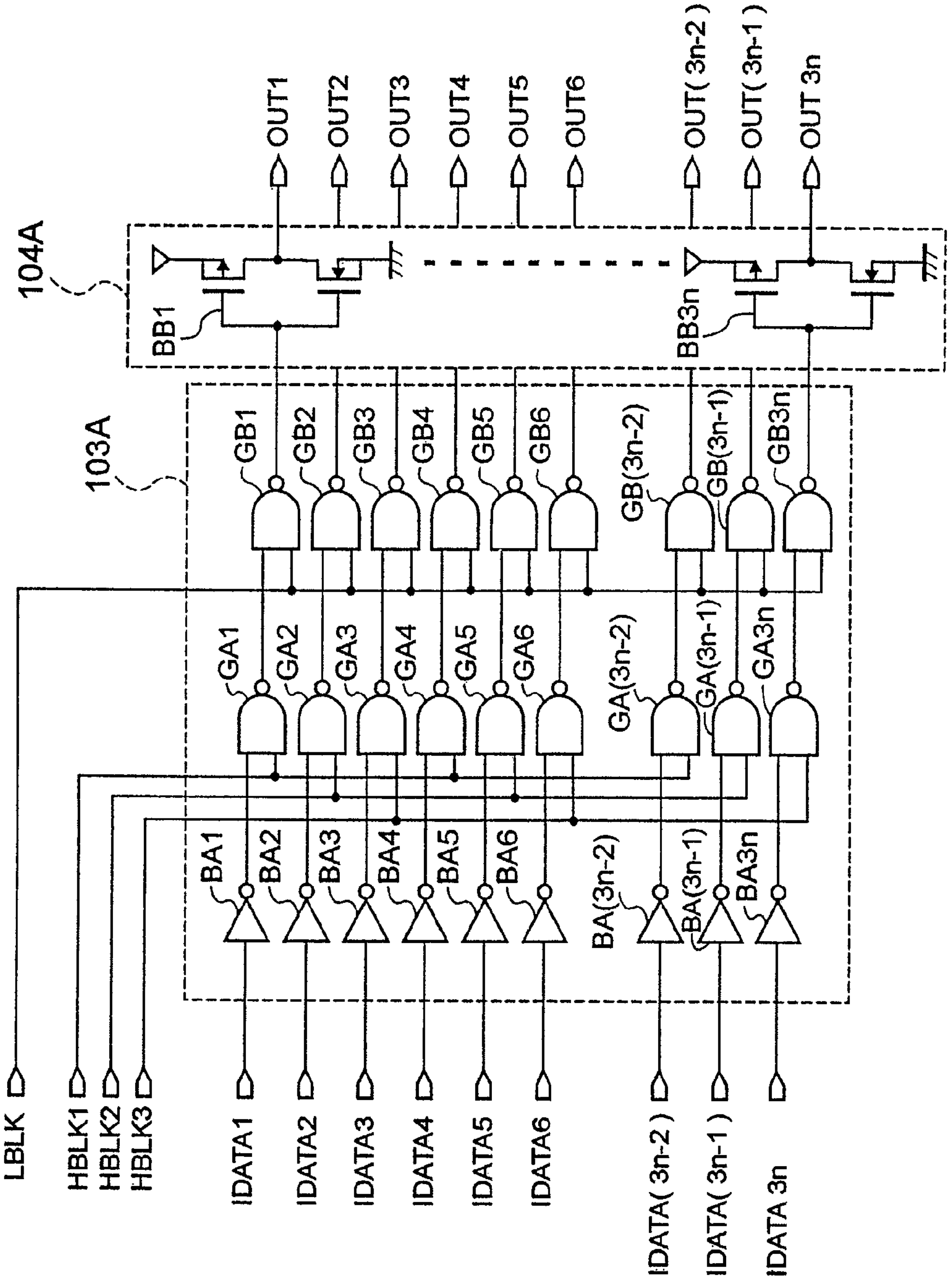
FIG. 9 is a circuit diagram of an output control circuit and a highly tolerant buffer in a PDP data driver IC according to a first embodiment of the present invention.
Figure 11:
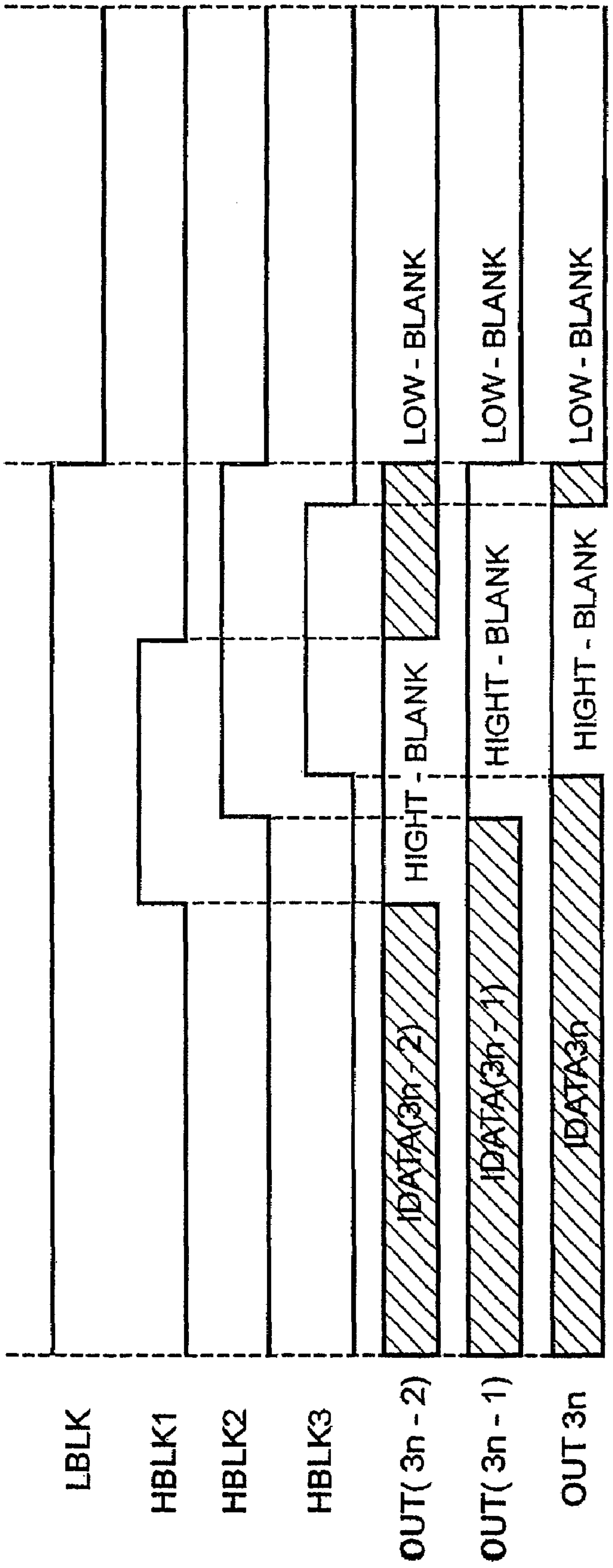
FIG. 11 is a timing chart showing operations of the output control circuit and the highly tolerant buffer of the PDP data driver IC in the first embodiment of the present invention.
Figure 12:
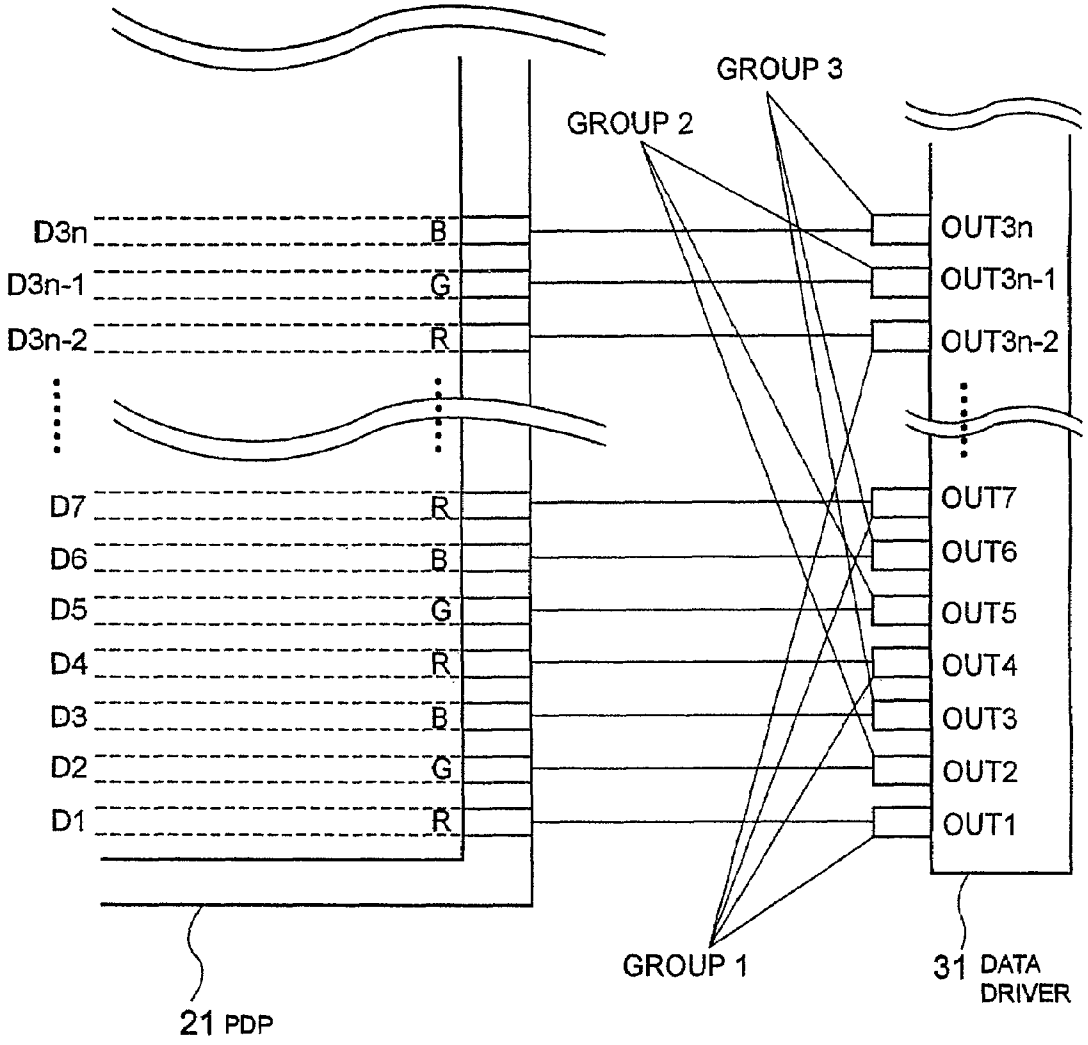
FIG. 12 shows connection for independently controlling electrodes for each of R, G, and B in a PDP by using the PDP data driver IC according to the first embodiment of the present invention.
Figure 13:
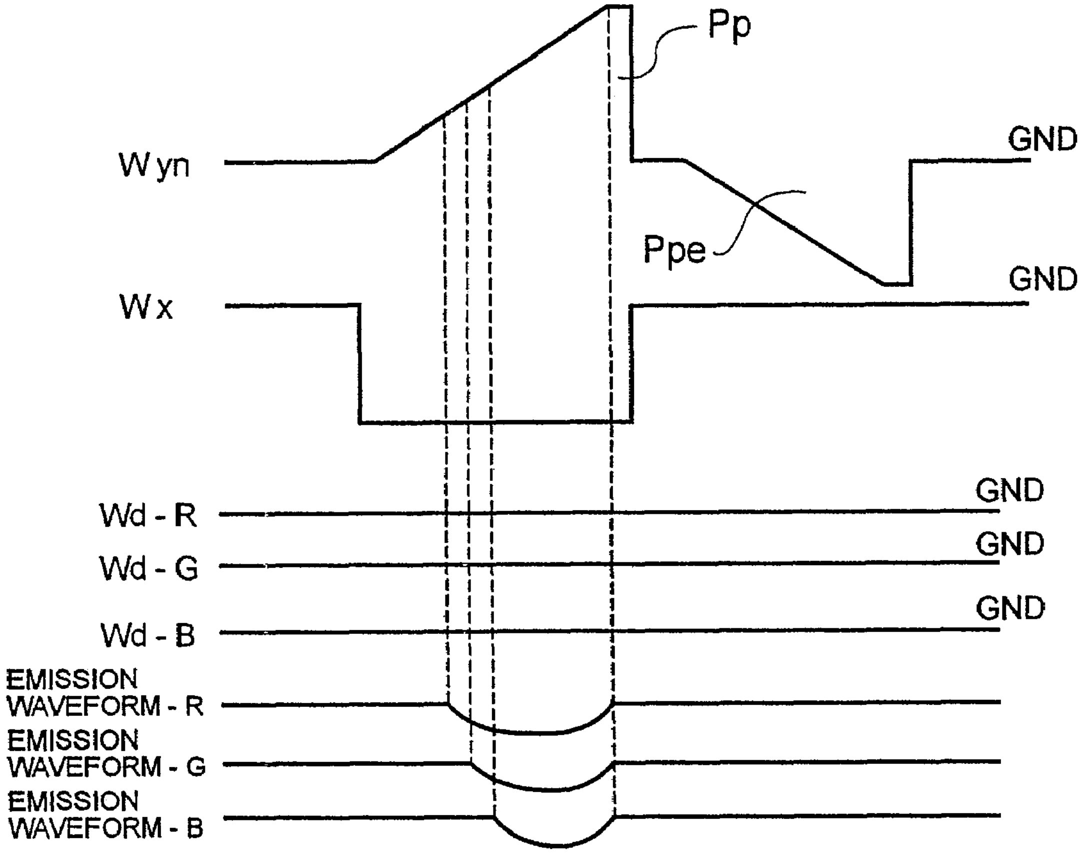
FIG. 13 is a timing chart showing a typical method for driving a PDP during a preliminary discharge period.
Figure 14:
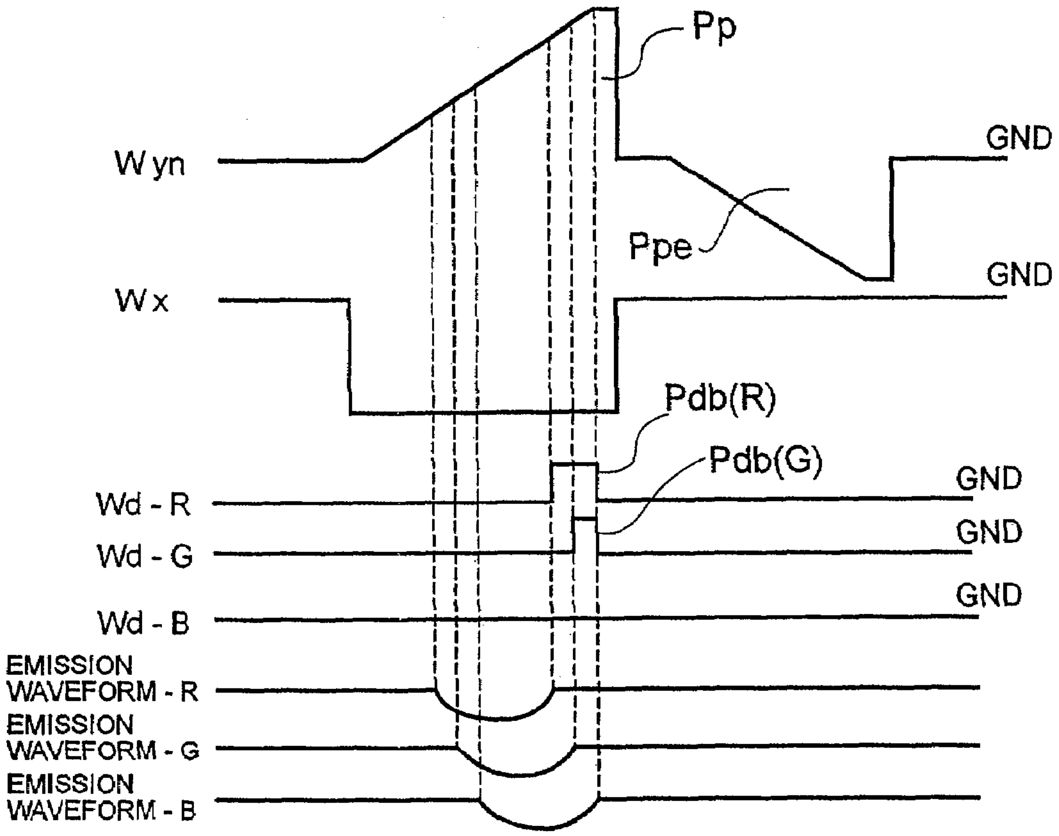
FIG. 14 is a timing chart showing a method for driving a PDP during the preliminary discharge period in the first embodiment of the present invention.

FIG. 9 is a circuit diagram of an output control circuit and a highly tolerant buffer in a PDP data driver IC according to a first embodiment of the present invention. FIG. 10 shows a truth table of the output control circuit and the highly tolerant buffer in the PDP data driver IC of the present embodiment. FIG. 11 is a timing chart showing operations of the output control circuit and the highly tolerant buffer in the PDP data driver IC of the present embodiment. FIG. 12 shows connection for independently controlling electrodes for each color, i.e., R, G, or B in a PDP by using the PDP data driver IC of the present embodiment. FIG. 13 is a timing chart showing a typical method for driving a PDP during a preliminary discharge period. FIG. 14 is a timing chart showing a method for driving a PDP during the preliminary discharge period in the present embodiment.

The PDP data driver IC of the present embodiment includes the output control circuit 103A and the highly tolerant buffer 104A, as shown in FIG. 9.

The output control circuit 103A includes an array of buffers BA1, BA2, BA3, . . . , BA(3n−2), BA(3n−1), and BA3n, an array of gates GA1, GA2, GA3, . . . , GA(3n−2), GA(3n−1), and GA3n that are formed by NAND circuits, respectively, and an array of gates GB1, GB2, GB3, . . . , GB(3n−2), GB(3n−1), and GB3n that are formed by NAND circuits, respectively.

All the NAND gates forming the gates GA1, GA2, GA3, . . . , GA(3n−2). GA(3n−1), and GA3n are connected at one inputs to input data IDATA1, IDATA2, IDATA3, . . . , IDATA(3n−2), IDATA(3n−1), and IDATA3n through the buffers BA1, BA2, BA3, . . . , BA(3n−2), BA(3n−1), and BA3n provided in the former stage, respectively. The other inputs of the NAND gates GA1, GA4, . . . , and GA(3n−2) are connected to a first high-blank control terminal HBLK1, the other inputs of the NAND gates GA2, GA5, . . . , and GA(3n−1) are connected to a second high-blank control terminal HBLK2, and the other inputs of the NAND gates GA3, GA6, . . . , and GA3n are connected to a third high-blank control terminal HBLK 3.

All the NAND gates forming the gates GB1, GB2, GB3, . . . , GB(3n−2), GB(3n−1), and GB3n are connected at one inputs to outputs of the gates GA1, GA2, GA3, . . . , GA(3n−2), GA(3n−1), and GA3n provided in the former stage, respectively, and are connected at the other inputs to a low-blank control terminal LBLK.

The highly tolerant buffer 104A includes buffer circuits BB1, . . . , and BB3n each of which is tolerant of a high voltage and is connected between a high voltage power source and ground. The buffer circuits BB1, . . . , and BB3n are connected at inputs to outputs of the gates GB1, GB2, GB3, . . . , GB(3n−2), GB(3n−1), and GB3n provided in the former stage, and are also connected at outputs to output terminals OUT1, OUT2, OUT3, . . . , OUT(3n−2), OUT(3n−1), and OUT3n, respectively.

As described above, outputs of the data driver IC of the present embodiment are divided into three groups, and three high-blank control terminals HBLK1, HBLK2, and HBLK3 are provided to correspond to those three groups (3n−2), (3n−1), and 3n, respectively. Thus, outputs of each of the three groups can be set to a high-blank state independently of outputs of other groups.

The truth table of the output control circuit and the highly tolerant buffer in the PDP data driver IC that have the structure shown in FIG. 9 is shown in FIG. 10.

More specifically, the high-blank control terminals HBLK1, HBLK2, and HBLK3 and the low-blank control terminal LBLK are low active. Therefore, when all the high-blank control terminals HBLK1, HBLK2, and HBLK3 and the low-blank control terminal LBLK are high, display data IDATA (3n−2), IDATA(3n−1), and IDATA3n input from the latch circuit provided in the former stage of the output control circuit 103A are output from corresponding outputs without change, respectively.

When only the high-blank control terminal HBLK1 is set to be active (i.e., low), output data OUT1, OUT4, and OUT (3n−2) become high irrespective of input data (i.e., high-blank state).

When only the high-blank control terminal HBLK2 is set to be active (i.e., low), output data OUT2, OUT5, . . . , and OUT(3n−1) become high irrespective of input data (i.e., high-blank state).

When only the high-blank control terminal HBLK3 is set to be active (i.e., low), output data OUT3, OUT6, . . . , and OUT3n become high irrespective of input data (i.e., high-blank state).

Thus, the output control circuit 103A and the highly tolerant buffer 104A of the PDP data driver IC that have the structure shown in FIG. 9 operate as shown in the timing chart of FIG. 11. That is, it is possible to independently perform high-blank control for each of the three groups of outputs.

In FIG. 11, when the outputs OUT(3n−2), OUT(3n−1) or OUT3n are set to the high-blank state, data electrodes corresponding to display data IDATA(3n−2), IDATA(3n−1), or IDATA3n become high (e.g., about 80 V). Thus, control is independently carried out for each group of outputs to lower a voltage across the data electrodes and scanning electrodes, thereby stopping opposed discharge between the data electrodes and the scanning electrodes. In the low-blank state, application of a data pulse to the data electrodes corresponding to display data IDATA(3n−2), IDATA(3n−1), and IDATA3n is forcedly terminated all at once.

As described above, the data driver of the present embodiment can independently set the high-blank state for each of display data IDATA(3n−2), IDATA(3n−1), and IDATA3n respectively corresponding to red (R), green (G), and blue (B). The data driver of the present embodiment can also set the low-blank state for the data electrodes for the respective colors all at once.

In the first embodiment shown in FIG. 9, the outputs OUT (3n−2), OUT(3n−1) and OUT 3n are respectively set to the high blank state by setting the signal at the high blank setting terminals HBLK1-HBLK3 at the L level. On the other hand the outputs OUT(3n−2), OUT(3n−1) and OUT 3n are respectively set to the low blank state by setting the signal at the low blank setting terminal LBLK at the L level.

However, it is possible to arrange the circuit that all of the outputs OUT(3n−2), OUT(3n−1) and OUT 3n are set to the low blank state by the data signal instead of setting the signal at the low blank setting terminal LBLK at the L level.

In this case, the output control circuit 103A can be further simplified because the array of gates GB1, GB2, GB3, . . . GB(3n−1), GB(3n) becomes unnecessary.

Besides, in the first embodiment, the stop timing of the preliminary discharge between the data electrode and the scanning electrode is controlled independently for each of the display cells of the primary colors. However, there can be a case that the difference of the discharge start voltages of the discharge cell R and the discharge cell G, for example, is small and the differences between the discharge start voltage of the discharge cell B and the discharge start voltages of the remaining discharge cells R, G only are large. In such case, only two of the high-blank control terminals, that is, HBLK1 and HBLK2 in the circuit shown in FIG. 9 may be used in order to control the stop timing of the preliminary discharges in the discharge cells R and G and the stop timing of the preliminary discharge in the discharge cell B independently.

In other words, instead of providing one high-blank control terminal or one low-blank control terminal for each of the discharge cells of primary colors R, G, B, it is possible to provide one high-blank control terminal or one low-blank control terminal for each unit that comprises one single color or a plurality of colors, to perform the control of the stop timing of the preliminary discharge on such a unit basis.

A suitable application of the data driver of the present embodiment is now described with reference to FIGS. 12, 13, and 14.

In a PDP, data electrodes for R, G, and B are sequentially and repeatedly arranged in an order of R, G, and B. A difference of voltage characteristics in a cell between colors in the above arrangement can be compensated by controlling an input waveform. In order to achieve this, in the present embodiment, three groups of the output terminals of the data driver IC are connected to the R, G, a B data electrodes of the PDP 21, respectively, as shown in FIG. 12.

In the following description, an example is described in which a PDP having the circuit structure shown in FIG. 9 is driven. This driving method uses a function of the data driver IC having the structure shown in FIG. 9 during the preliminary discharge period of the PDP driving waveform shown in FIG. 4.

Figure 1:
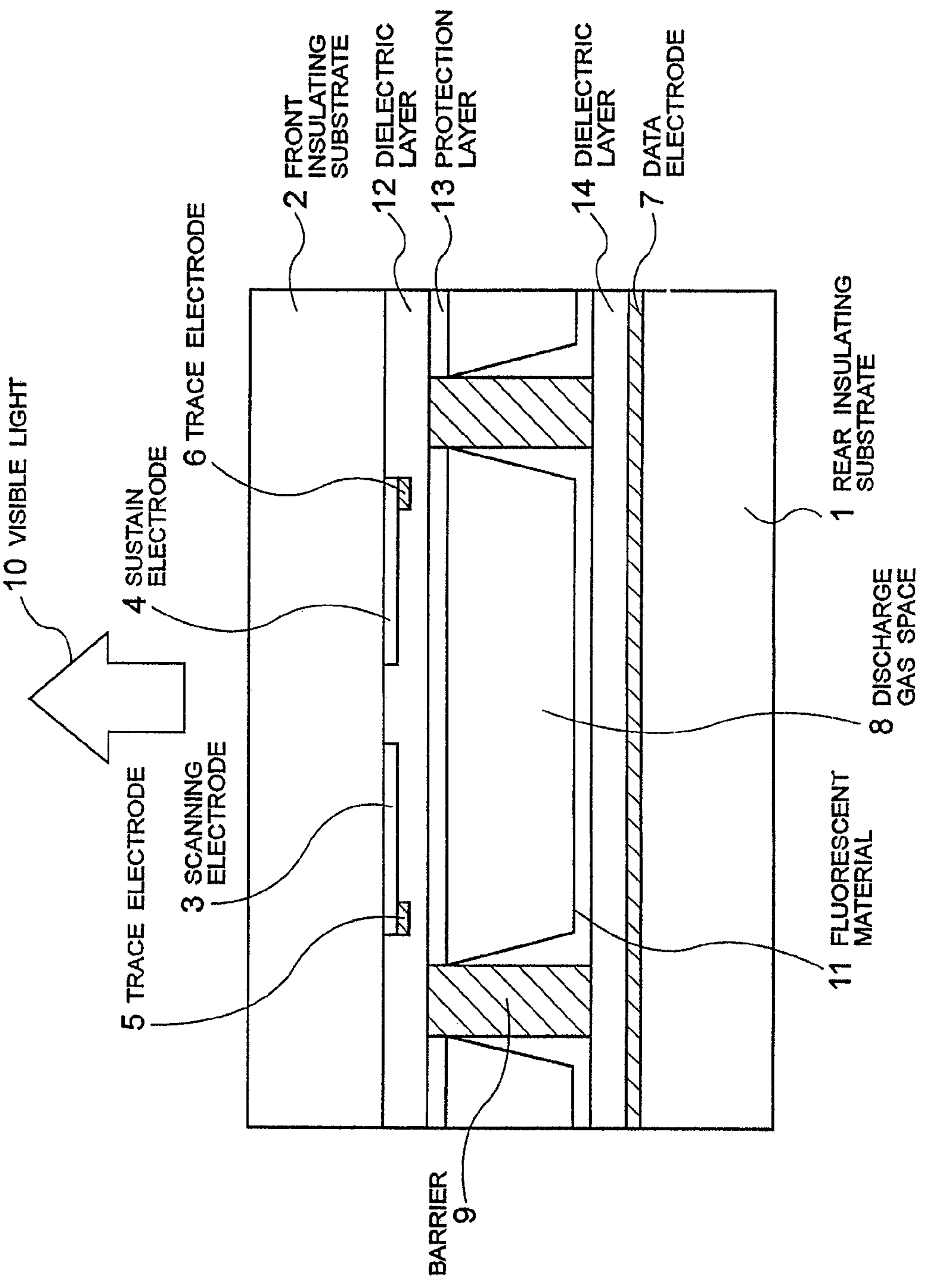
FIG. 1 PRIOR ART
FIG. 1 is a cross-sectional view showing the structure of a display cell in a typical AC discharge memory operation type PDP.
Figure 2:
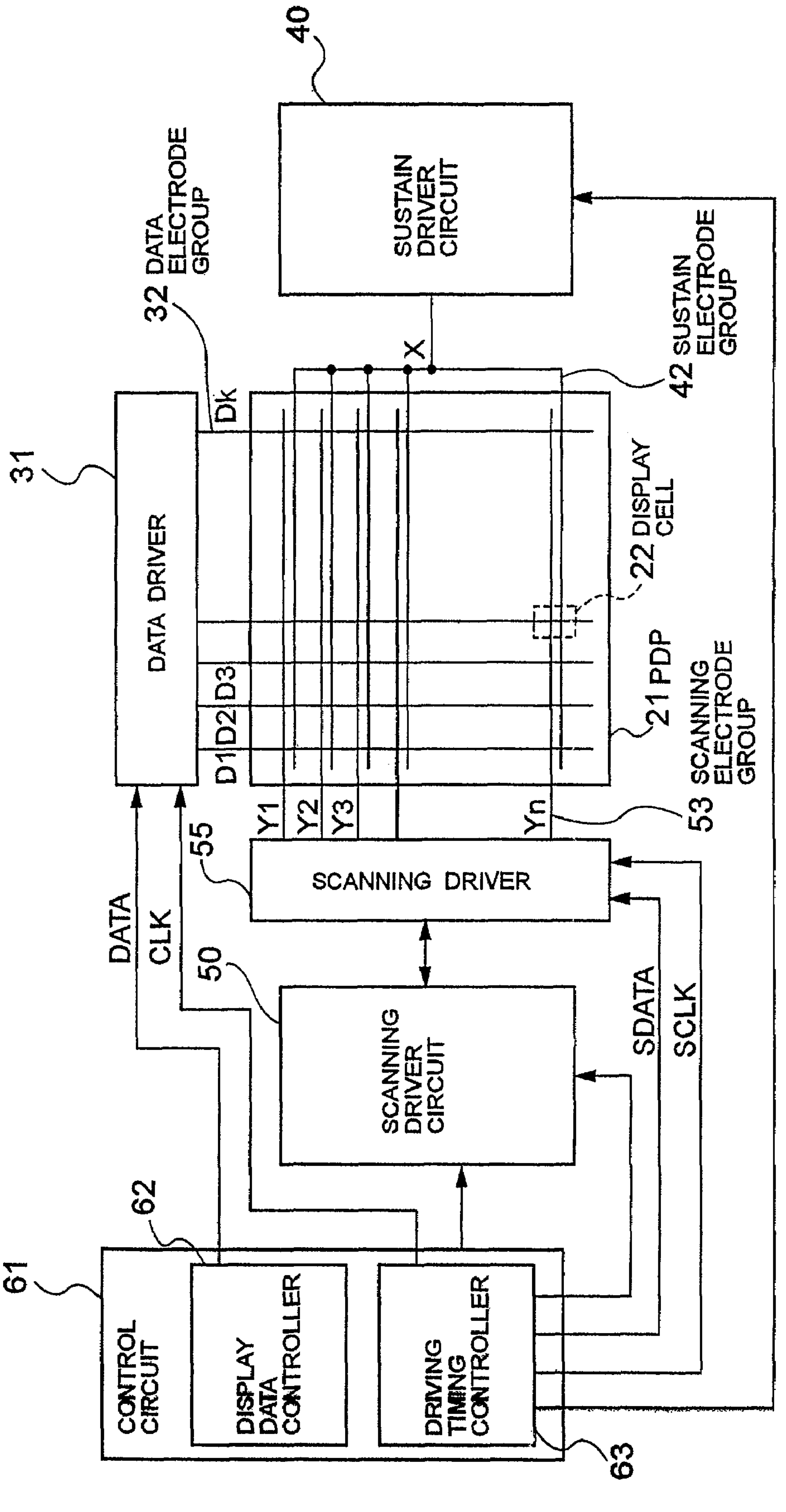
FIG. 2 PRIOR ART
FIG. 2 is a block diagram of an example of a typical PDP driving device.
Figure 3:
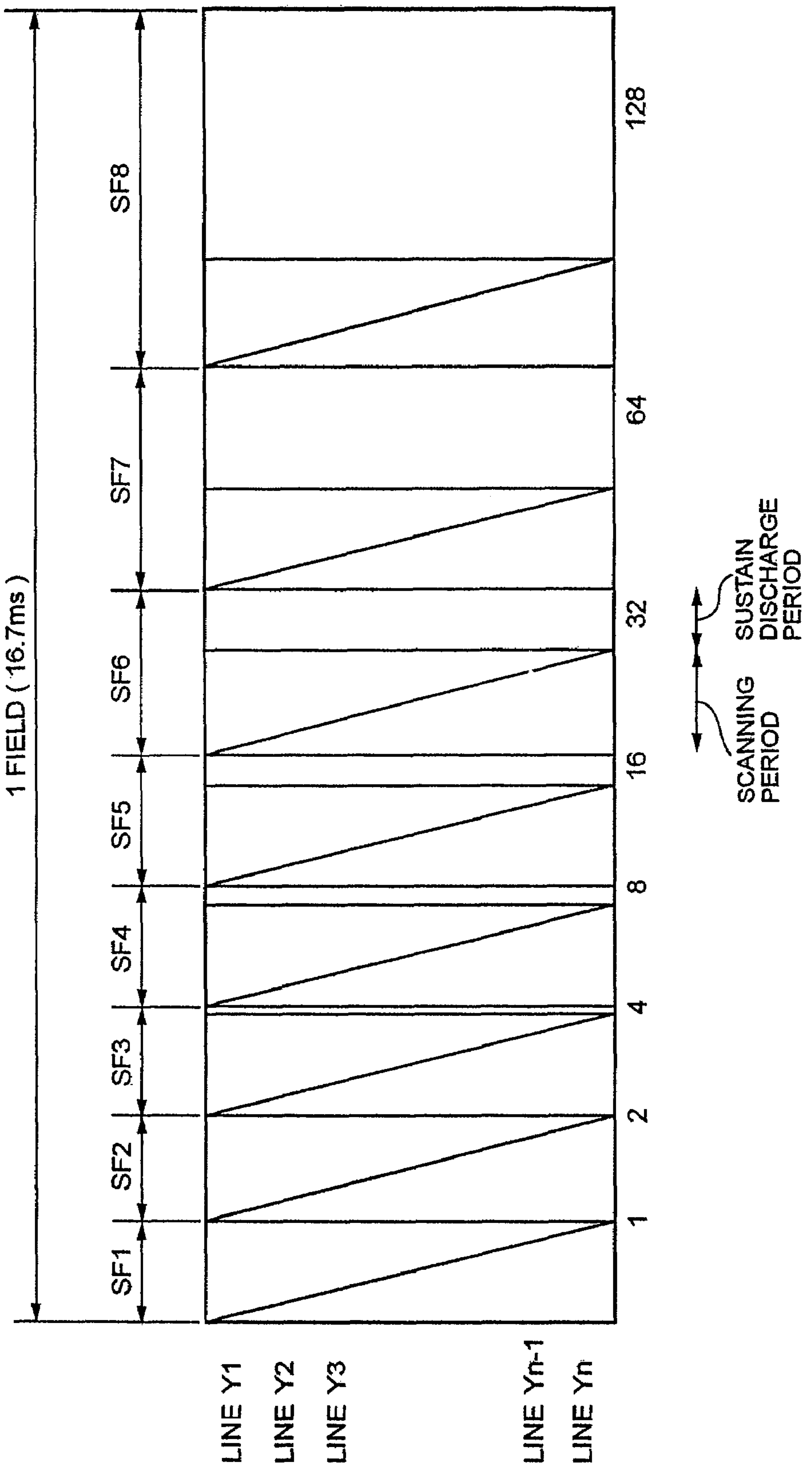
FIG. 3 PRIOR ART
FIG. 3 is a time chart showing an operation in one field in the typical PDP.
Figure 4:
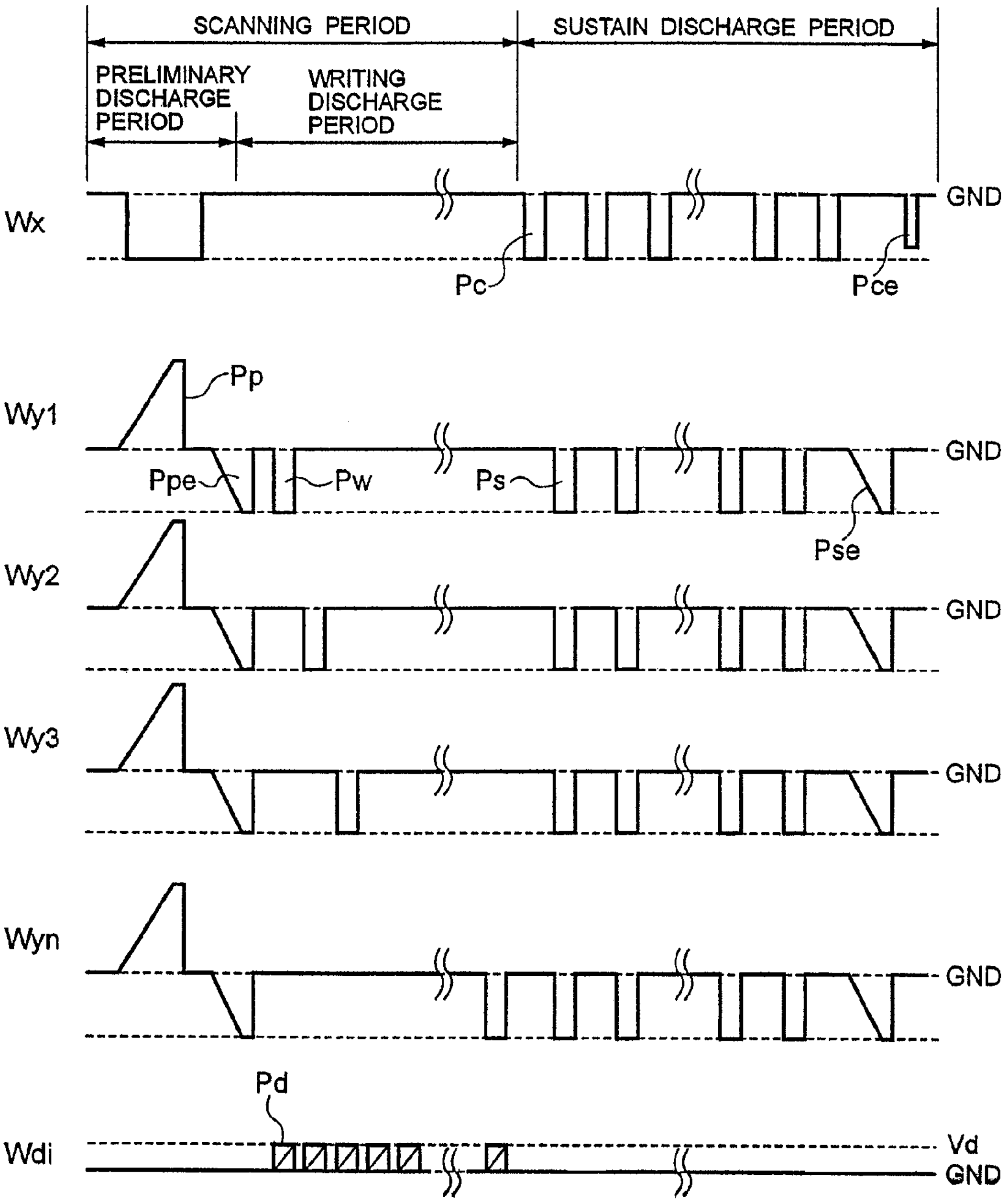
FIG. 4 PRIOR ART
FIG. 4 is a time chart showing an operation in one sub-field in the typical PDP.
Figure 5:
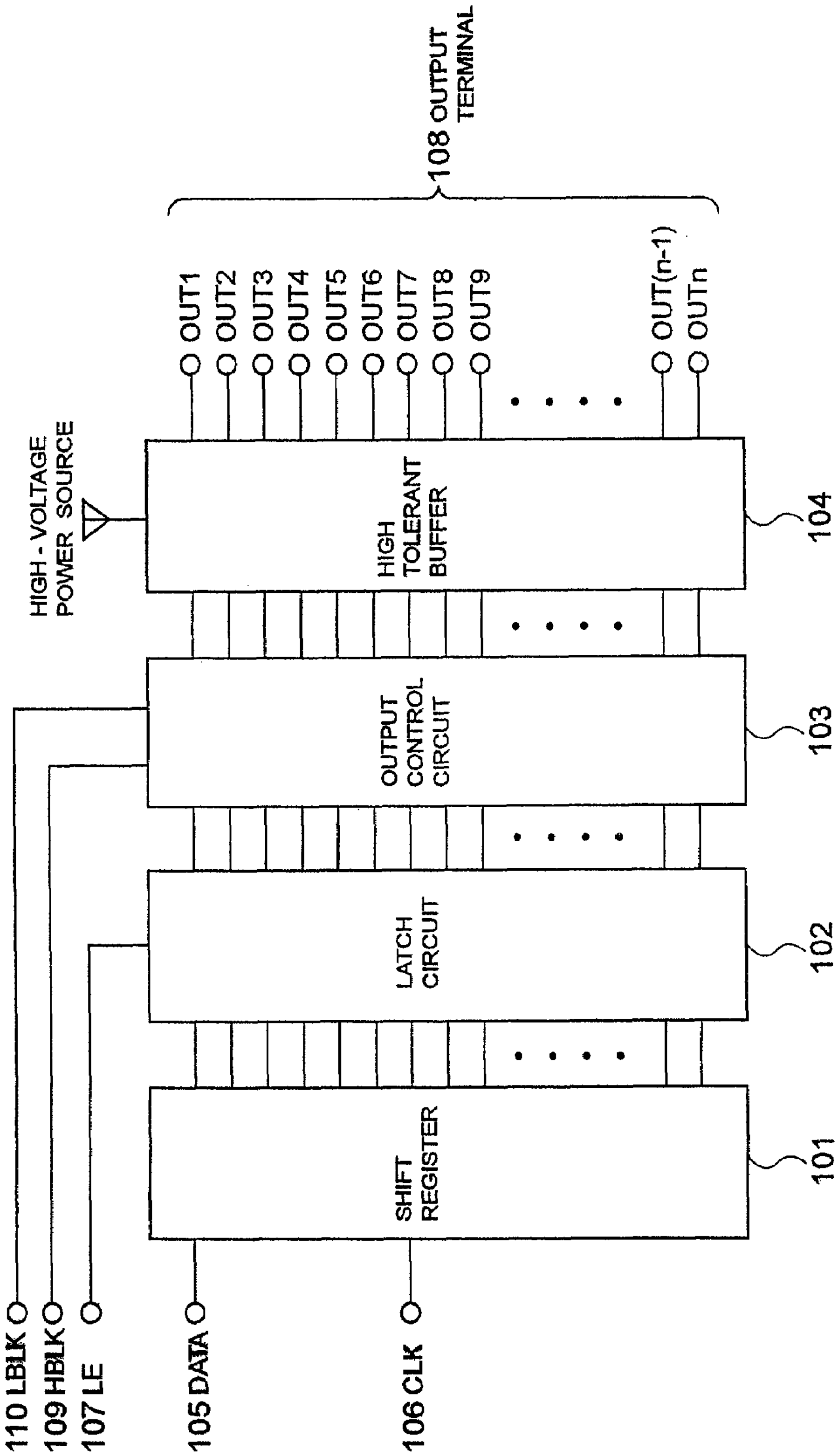
FIG. 5 PRIOR ART
FIG. 5 is a block diagram showing a circuit structure of a typical PDP data driver IC.

The preliminary discharge pulse Pp shown in FIG. 4 is formed by a saw-tooth wave in which potential changes at a rate of several volts per microsecond and finally reaches approximately 300 to 400V.

When that preliminary discharge pulse Pp is applied and the potential of that pulse exceeds a firing potential between a scanning electrode and a sustain electrode and between data electrodes, weak discharge occurs. This discharge continues to occur while the potential of the preliminary discharge pulse Pp is changing. When the potential of the preliminary discharge pulse Pp reaches its finally reaching voltage, discharge stops. The preliminary discharge pulse Pp is applied in order to activate the inside of the cells and make wall charges uniform.

In the PDP, R, G, and B cells are painted with R, G, and B fluorescent materials, respectively. The voltage characteristics of each cell are different between the colors because of a difference of electric properties between the fluorescent materials of the respective colors, as described above.

In this case, the firing potential between the data electrode and the scanning electrode or between the data electrode and the sustain electrode is also different between the colors largely, because the fluorescent materials are arranged on a data substrate.

For example, a case is considered in which the firing potential between the data electrode and the scanning electrode is 190V in the R cell, 195V in the G cell, and 200V in the B cell, and the finally reaching potential of the preliminary discharge pulse Pp is 300V. In a typical PDP, discharge in the R cell starts when the potential of the preliminary discharge pulse Pp reaches 190V, as shown in FIG. 13. Next, discharge in the G cell starts and thereafter discharge in the B cell starts. The discharge of the respective cells continues until the potential of the preliminary discharge pulse Pp reaches 300V, and stops when increase of the potential of the preliminary discharge pulse Pp stops. Please note that emission waveforms R, G, and B shown in FIG. 13 are waveforms of discharge emission occurring between the scanning electrodes and the data electrodes Wd-R, Wd-G, and Wd-B, respectively.

While the above discharge occurs, the data electrodes serve as cathodes. Thus, positive wall charges are accumulated in the data electrodes. The amount of the thus accumulated wall charges is the largest in the R cell in which discharge continues to occur for the longest time. The G cell is the second largest after the R cell. The B cell is the smallest in the amount of the accumulated wall charges.

The thus accumulated wall charges are added to a data pulse having a positive polarity that is applied to the data electrode during the following writing discharge period, thereby lowering the firing potential. Thus, the accumulated wall charges have an effect of allowing writing discharge to easily occur.

The finally reaching potential of the preliminary discharge pulse Pp is set in such a manner that the aforementioned effect can sufficiently be achieved in the B cell that has the highest firing potential. Therefore, in a cell having a lower firing potential than the B cell, especially in the R cell having the lowest firing potential, excessive preliminary discharge occurs.

Preliminary discharge occurs regardless of whether or not any cell is selected. Therefore, preliminary discharge increases the brightness of a cell that is to display black. That is, a phenomenon that the color displayed by that cell is not inky black but dark gray occurs. This phenomenon degrades the display quality.

In order to prevent that phenomenon from occurring, in the data driver IC of the present embodiment, a data bias pulse Pdb is applied to the data electrode while the preliminary discharge pulse Pp is applied after preliminary discharge occurs, thereby shortening duration of preliminary discharge of the cell having the lower firing potential. In this manner, excess preliminary discharge in the cell having the lower firing potential can be suppressed, thus preventing the increase of the brightness of the cell that is to display black.

FIG. 14 is a timing chart showing a method for driving a PDP using the data driver IC of the present embodiment during the preliminary discharge period.

In this example, after preliminary discharge occurs, the data bias pulse Pdb is applied to the data electrode while the preliminary discharge pulse Pp is applied. The amplitude of the data bias pulse is set to 80V so as to lower the voltage applied across the data electrode and the scanning electrode by 80V. In this manner, preliminary discharge between the data electrode and the scanning electrode is stopped. Please note that emission waveforms R, G, and B in FIG. 14 are waveforms of discharge emission occurring between the scanning electrodes and the data electrodes Wd-R, Wd-G, and Wd-B, respectively.

As shown in FIG. 14, the data bias voltage Pdb(R) is applied to the R data electrode Wd-R and the data bias voltage Pdb(G) is applied to the G data electrode Wd-G in the order shown in FIG. 14, thereby stopping excess preliminary discharge in the R and G cells.

In this manner, the increase of the brightness of the cell that is to display black can be suppressed by preventing excess preliminary discharge in the R and G cells. Thus, the display quality can be improved.

However, in the case where the potential of the preliminary discharge pulse goes up at a rate of 6V per microsecond, it is practically necessary to apply the data bias pulse Pdb at an interval of one microsecond or less in the aforementioned method for driving the data driver IC. Therefore, when a data transfer operation by the shift register 101 is considered, there is no time for performing such an operation for transferring data as a normal data display signal.

Thus, instead of using the data bias pulse Pdb, the function of setting the high-blank state for the data electrodes is used. As shown in FIG. 9, the high-blanking function for forcedly setting the outputs of the data driver IC to be high is divided into R, G, and B. Output terminals that are controlled by the divided high-blank control terminals HBLK1, HBLK2, and HBLK3 are connected to R data electrodes, G data electrodes, and B data electrodes of the PDP, respectively, thereby supplying a pulse of 80V that is the same magnitude as the data bias pulse Pdb by performing high-blanking control during the preliminary discharge period. In this manner, excess preliminary discharge can be controlled.

As described above, in the data driver IC of the present embodiment, the high-blank control terminal for controlling the high-blank state is provided for each of the R cells, the G cells, and the B cells to control the high-blank state for each color. Moreover, the data electrodes corresponding to the cells of a color for which the firing voltage of preliminary discharge is low are set to the high-blank state while the preliminary discharge pulse Pp is applied, thereby shortening duration of preliminary discharge of those cells. Thus, it is possible to compensate a difference of the duration of preliminary discharge between colors caused by a difference of voltage characteristics between fluorescent materials of the respective colors, without providing an independent data driver for each color and hence making interconnection between the data driver ICs and the PDP complicated. Therefore, excess preliminary discharge occurring in cells of a specific color can be suppressed, resulting in improvement of the display quality.

Figure 6:
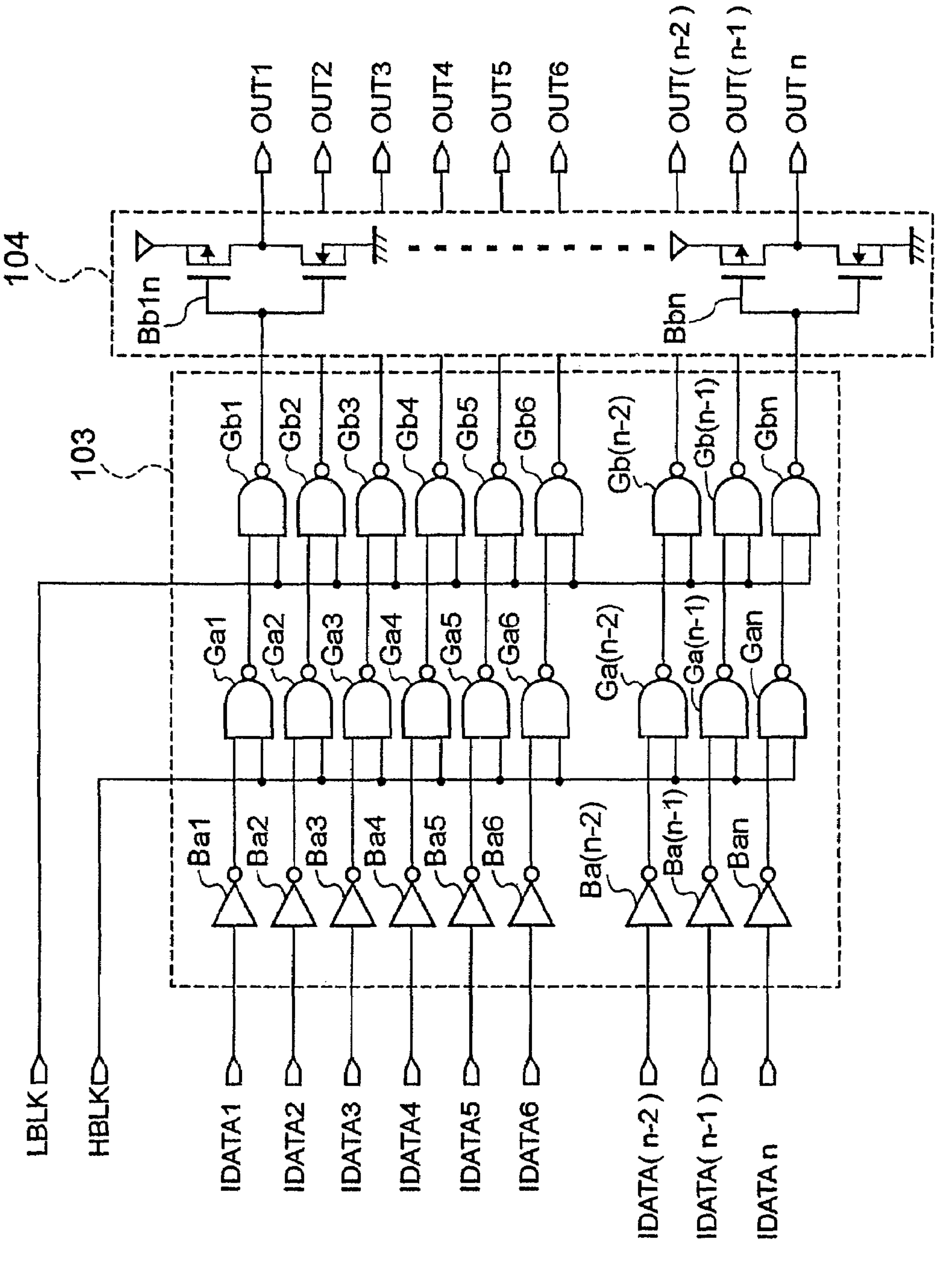
FIG. 6 PRIOR ART
FIG. 6 shows a circuit structure of an output control circuit and a highly tolerant buffer in the typical PDP data driver IC.
Figure 7:
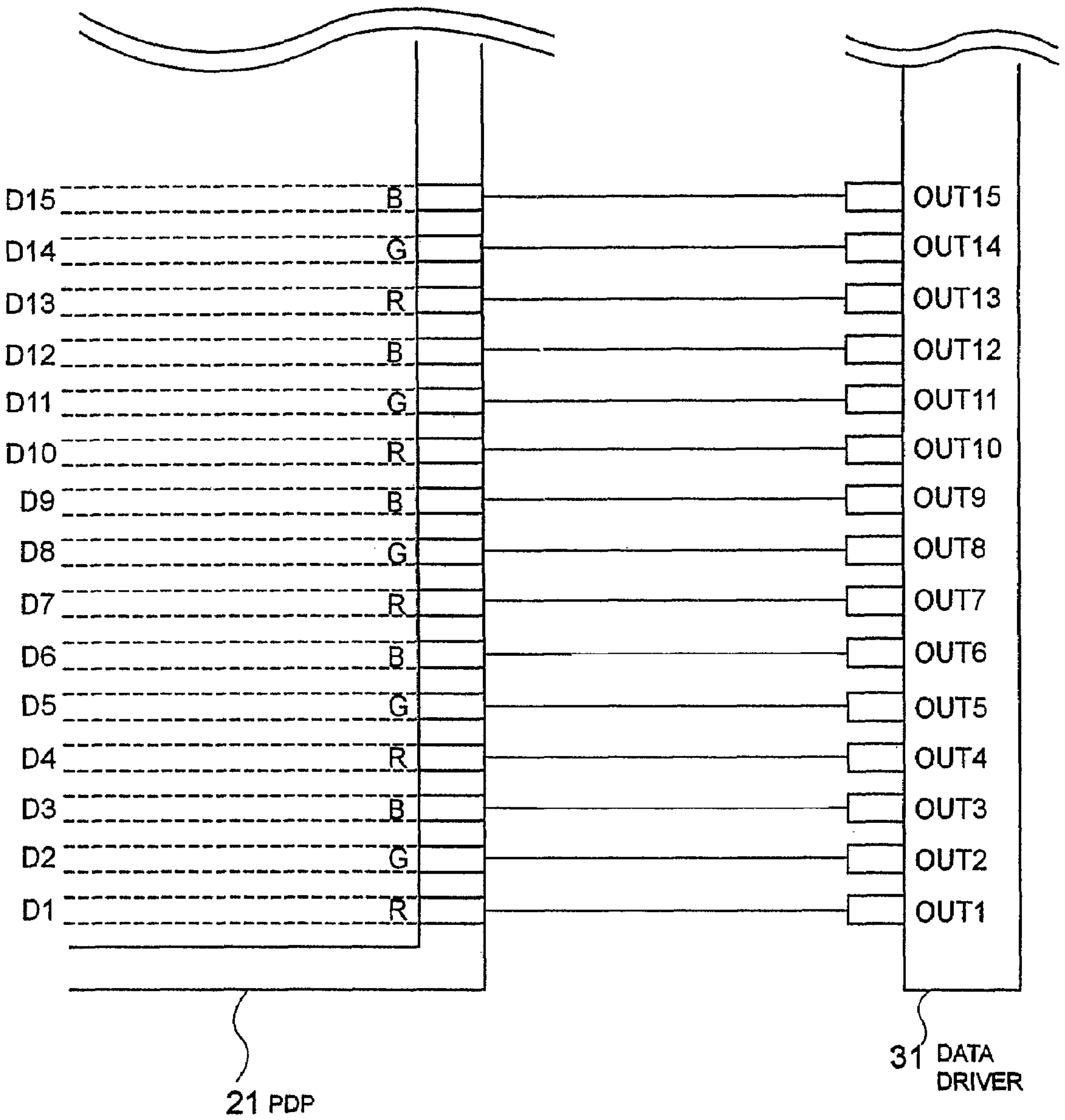
FIG. 7 PRIOR ART
FIG. 7 shows typical connection between a PDP and a PDP data driver.
Figure 8:
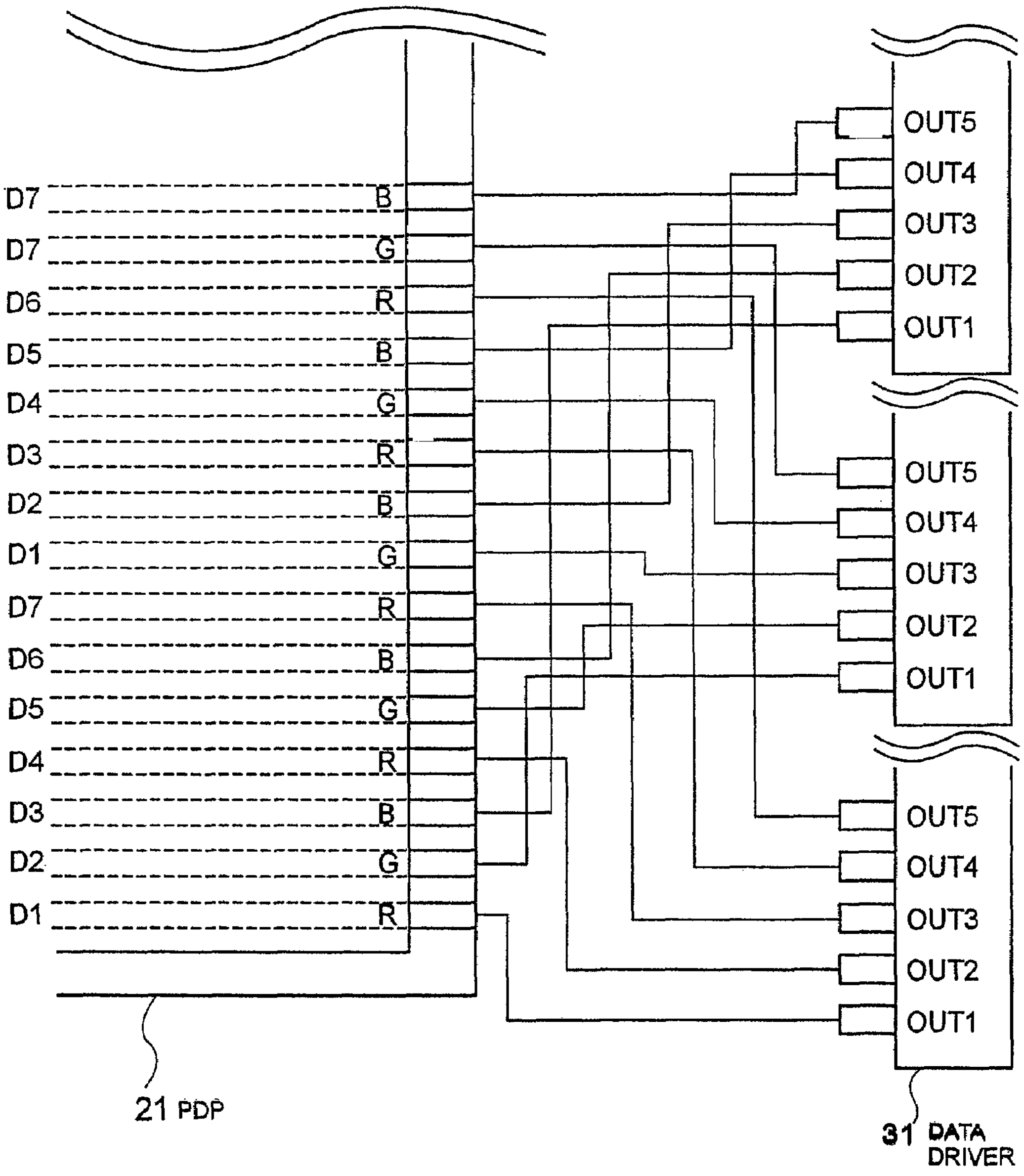
FIG. 8 PRIOR ART
FIG. 8 shows connection for independently controlling electrodes for each of R, G, and B in a PDP by using a conventional PDP data driver IC.

The conventional data driver IC shown in FIG. 6 can also suppress preliminary discharge during the preliminary discharge period. However, that conventional data driver IC cannot independently control the discharge duration for each color as in the present embodiment.

Figure 15:
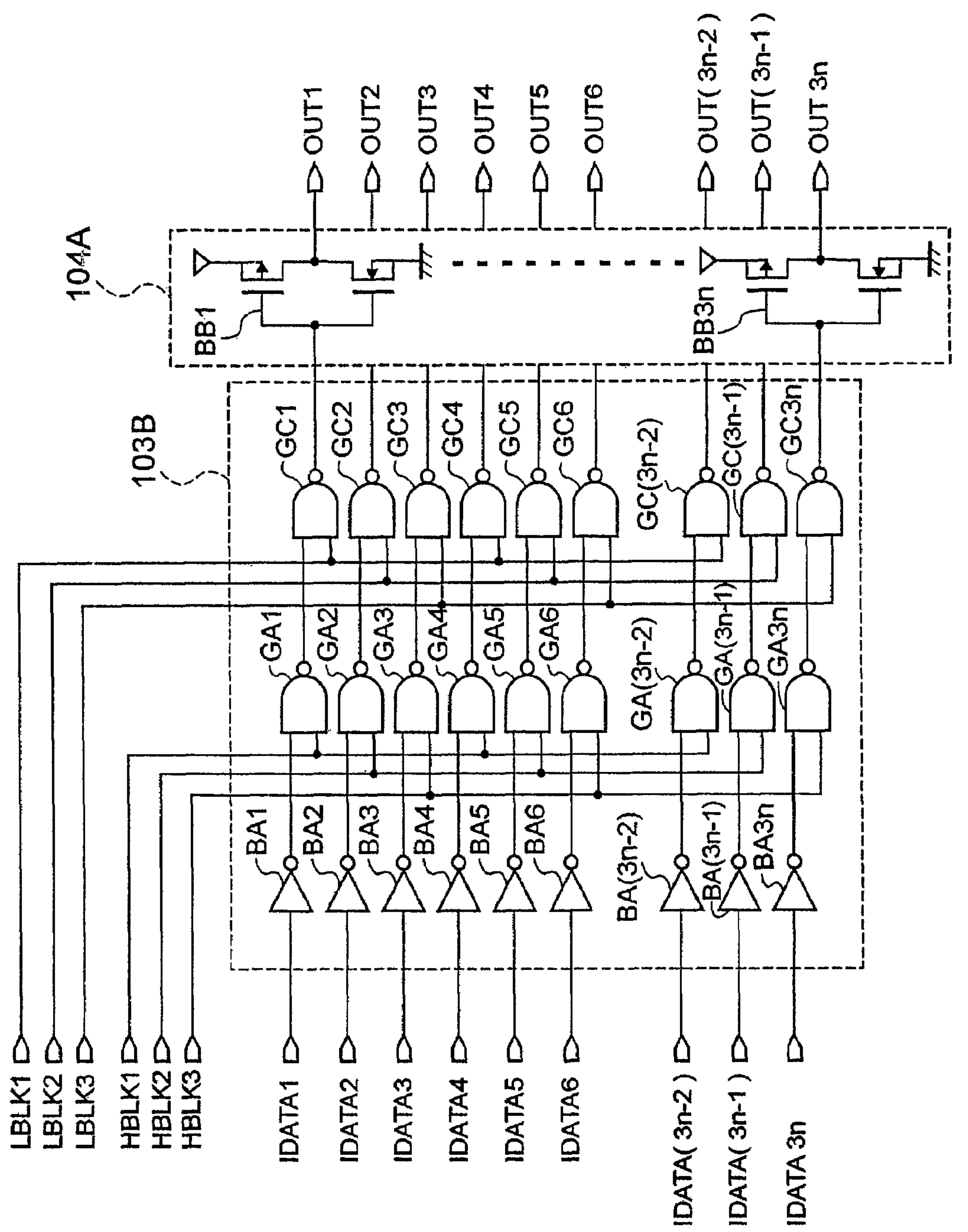
FIG. 15 is a circuit diagram of an output control circuit and a highly tolerant buffer in a PDP data driver IC according to a second embodiment of the present invention.
Figure 17:
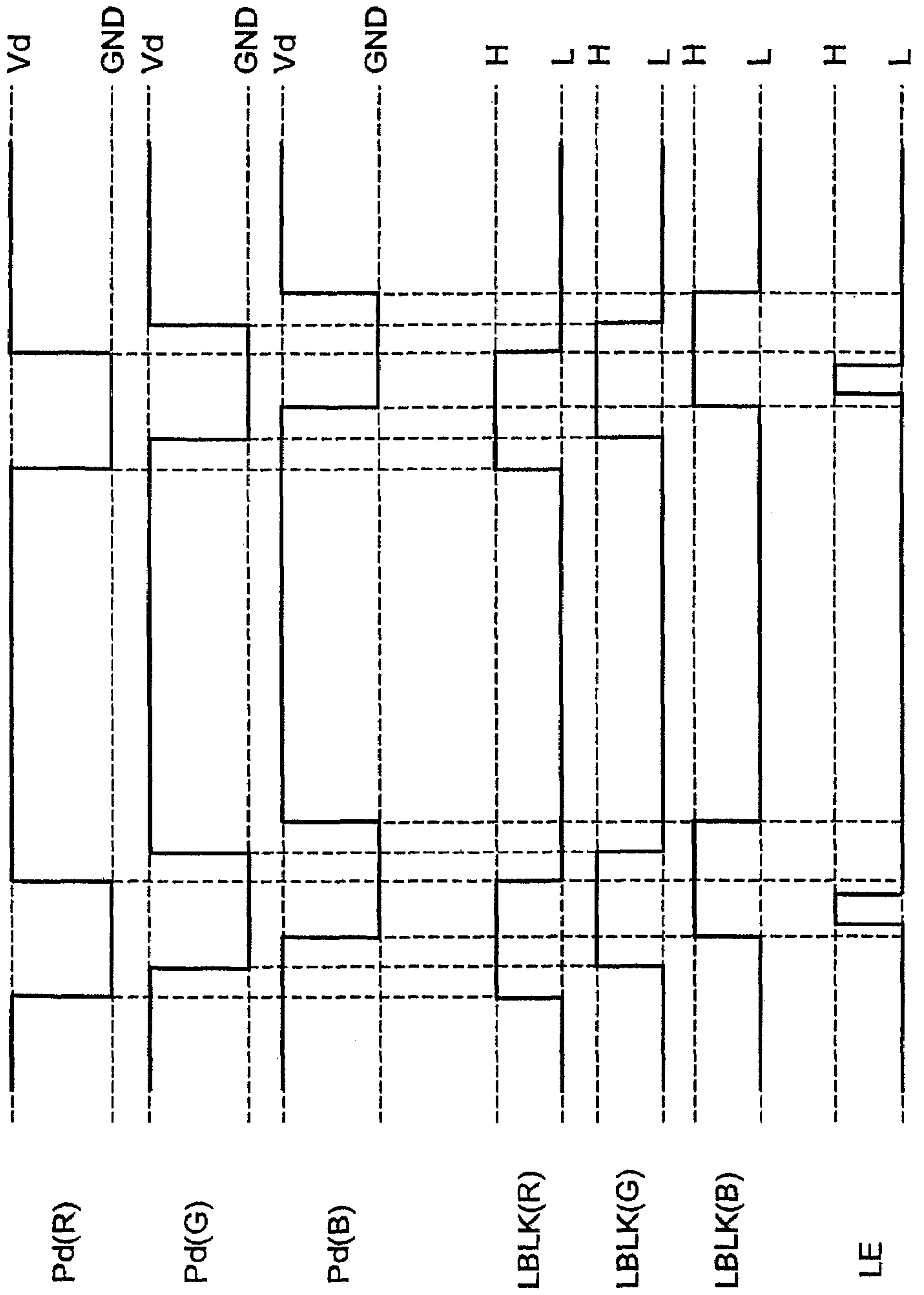
FIG. 17 is a timing chart showing a method for driving a plasma display during a writing discharge period in the second embodiment of the present invention.
Figure 18:
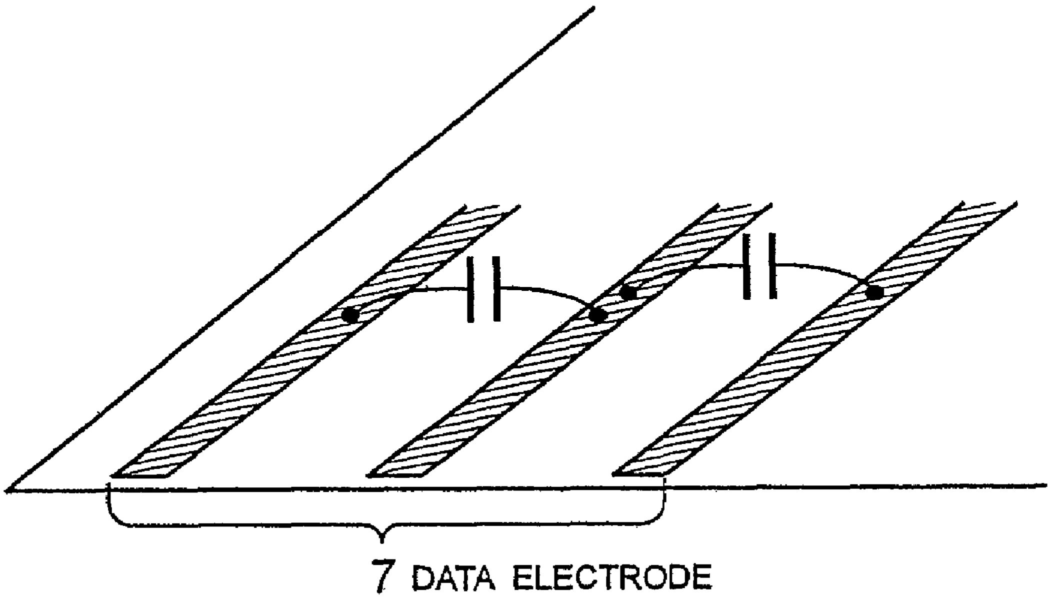
FIG. 18 schematically shows an electrostatic capacitance between adjacent data electrodes in a plasma display panel.

FIG. 15 is a circuit diagram of an output control circuit and a highly tolerant buffer of the PDP data driver of a second embodiment of the present invention. FIG. 16 shows a truth table of the output control circuit and the highly tolerant buffer. FIG. 17 is a timing chart showing a method for driving a plasma display during a writing discharge period in the present embodiment. FIG. 18 is a schematic diagram showing an electrostatic capacitance between adjacent data electrodes in the plasma display panel.

The PDP data driver IC of the present embodiment includes the output control circuit 103B and the highly tolerant buffer 104A, as shown in FIG. 15.

The output control circuit 103B is the same as that of the first embodiment shown in FIG. 9 in the structure including the array of buffers BA1, BA2, BA3, . . . , BA(3n−2), BA(3n−1), and BA3n and the array of gates GA1, GA2, GA3, . . . , GA(3n−2), GA(3n−1), and GA3n that are respectively formed by NAND circuits. However, the output control circuit 103B of the present embodiment is different from that of the first embodiment in a method for inputting a low-blank control signal to an array of gates GC1, GC2, GC3, . . . , GC(3n−2), GC(3n−1), and GC3n that are respectively formed by NAND circuits.

The highly tolerant buffer 104A is the same as that of the first embodiment shown in FIG. 9.

All NAND gates forming the gates GA1, GA2, GA3, . . . , GA(3n−2). GA(3n−1), and GA3n are connected at one inputs to outputs of buffers BA1, BA2, BA3, . . . , BA(3n−2), BA(3n−1), and BA3n provided in the former stage of those gates, respectively. The other inputs of the gates GA1, GA4, . . . , and GA(3n−2) are connected to a first high-blank control terminal HBLK1. The other inputs of the gates GA2, GA5, . . . , and GA(3n−1) are connected to a second high-blank control terminal HBLK2. The other inputs of the gates GA3, GA6, . . . , and GA3n are connected to a third high-blank control terminal HBLK3.

All NAND gates forming the gates GB1, GB2, GB3, . . . , GB(3n−2), GB(3n−1), and GB3n are connected at one inputs to outputs of the gates GA1, GA2, GA3, . . . , GA(3n−2), GA(3n−1), and GA3n provided in the former stage, respectively. The other inputs of the gates GB1, GB4, . . . , and GB(3n−2) are connected to a first low-blank control terminal LBLK1. The other inputs of the gates GB2, GB5, . . . , and GB(3n−1) are connected to a second low-blank control terminal LBLK2. The other inputs of the gates GB3, GB6, . . . , and GB3n are connected to a third low-blank control terminal LBLK3.

As described above, in the data driver IC of the present embodiment, outputs are divided into three groups. The outputs of each of those three groups can be independently set to the high-blank state and the low-blank state by providing the high-blank control terminals HBLK1, HBLK2, and HBLK3 and the low-blank control terminals LBLK1, LBLK2, and LBLK3 to correspond to those three groups, respectively.

The truth table of the output control circuit and the highly tolerant buffer of the PDP data driver IC having the circuit structure shown in FIG. 15 is shown in FIG. 16.

The high-blank control terminals HBLK1, HBLK2, and HBLK3 and the low-blank control terminals LBLK1, LBLK2, and LBLK3 are low active.

When both the high-blank control terminal HBLK1 and the low-blank control terminal LBLK1 are high, display data IDATA1, IDATA4, . . . , and IDATA(3n−2) input from the latch circuit provided in the former stage of the output control circuit are output as outputs OUT1, OUT4, . . . , and OUT (3n−2) without change. When only the high-blank control terminal HBLK1 is active (low), the outputs OUT1, OUT4, . . . , and OUT(3n−2) are high irrespective of input data (i.e., high-blank state). When only the low-blank control terminal LBLK1 is active (low), the outputs OUT1, OUT4, . . . , and OUT(3n−2) are low (i.e., low-blank state).

Similarly, when both the high-blank control terminal HBLK2 and the low-blank control terminal LBLK2 are high, display data IDATA2, IDATA5, . . . , and IDATA(3n−1) input from the latch circuit provided in the former stage are output as outputs OUT2, OUT5, . . . , and OUT(3n−1) without change. When only the high-blank control terminal HBLK2 is active (low), the outputs OUT2, OUT5, . . . , and OUT(3n−1) are high irrespective of input data (i.e., high-blank state). When only the low-blank control terminal LBLK2 is active (low), the outputs OUT2, OUT5, . . . , and OUT(3n−1) are low (i.e., low-blank state).

Similarly, when both the high-blank control terminal HBLK3 and the low-blank control terminal LBLK3 are high, display data IDATA3, IDATA6, . . . , and IDATA3n input from the latch circuit provided in the former stage are output as outputs OUT3, OUT6, . . . , and OUT3n without change. When only the high-blank control terminal HBLK3 is active (low), the outputs OUT3, OUT6, . . . , and OUT3n are high irrespective of input data (i.e., high-blank state). When only the low-blank control terminal LBLK3 is active (low), the outputs OUT3, OUT6, . . . , and OUT3n are low (i.e., low-blank state).

As described above, in the circuit shown in FIG. 15, the high-blank control terminals HBLK1, HBLK2, and HBLK3 are provided to correspond to the three groups of the output terminals of the data driver IC, that are represented by 3n−2, 3n−1, and 3n, respectively. Moreover, the low-blank control terminals LBLK1, LBLK2, and LBLK3 are also provided to correspond to the three groups of the output terminals, respectively. Therefore, it is possible to independently control the outputs of each group to achieve the high-blank state and the low-blank state.

In the structure shown in FIG. 15, not only the high-blank control terminal but also the low-blank control terminal are divided into three. Therefore, it is possible to perform PDP driving control during the preliminary discharge period in a similar manner to that in the first embodiment, and is also possible to perform different driving control.

A suitable application of the data driver of the present embodiment is now described with reference to FIGS. 17 and 18.

A data pulse is applied to data electrodes in accordance with display data during a writing discharge period, as described above. During the application of the data pulse, a displacement current for charging and discharging a data electrode flows through the data electrode, thereby generating an electromagnetic wave. Since all the data electrodes are simultaneously driven, a level of the electromagnetic wave is high. Such a high-level electromagnetic wave may cause a noise.

The data driver IC of the present embodiment reduces the number of the data electrodes that are driven at approximately the same time by using low-blanking that can be made to occur for each of the three groups, thereby suppressing the electromagnetic wave.

The data driver IC of the present embodiment drives the data electrodes during the writing discharge period by using low-blanking that can made to occur for each of the three groups, in accordance with a timing chart shown in FIG. 17.

In FIG. 17, Pd(R), Pd(G), and Pd(B) represent waveforms of data pulses that are applied to R data electrodes, G data electrodes, and B data electrodes, respectively. LBLK(R), LBLK(G), and LBLK(B) represent low-blanking signals that drive the R data electrodes, the G data electrodes, and the B data electrodes, respectively. LE represents a latch enable signal for transferring data in the shift register 101 to the highly tolerant buffer 104A. Vd represents a crest value of an output voltage of the data pulse that is set to several tens of volts. H and L in the waveform of each of the LBLK signals and LE signal represent a high level and a low level of a logic signal, respectively. In general, H is several volts (e.g., 5V or less) and L is GND level.

In the data driver IC of the present embodiment, low-blanking is made active at termination of the data pulse in each of the R data electrode group, the G data electrode group, and the B electrode group, so as to set the data pulse to be GND level. Low-blanking is made active at different timings between the R, G and B data electrode group. Next, the LE signal is made active so as to transfer the next display data from the shift register to the highly tolerant buffer. Then, low-blanking is released at different timings between the R, G, and B data electrode groups, and the next data pulse is applied.

In this manner, it is possible to make timings at which the data pulse is applied to the data electrodes different between the R, G, and B data electrode groups.

As described above, in the data driver IC of the present embodiment, the number of the data electrodes that are driven in the same time period can be reduced by making the application timings of the data pulse different between R, G, and B without providing an independent data driver for every color and hence making interconnection between the data driver ICs and the PDP complicated. Thus, the electromagnetic wave caused by the displacement current can be suppressed.

Moreover, since the application timings of the data pulse to the data electrodes are made different between R, G, and B, the application timings of the data pulse are different between adjacent data electrodes in the driving method of the present embodiment. However, an electrostatic capacitance is formed between the adjacent data electrodes, as shown in FIG. 18. Thus, rising of the data pulse is gentler as compared with a case in which the data pulse is applied in adjacent cells at the same time. Therefore, the driving method of the present embodiment in which the application timings of the data pulse are made different between the adjacent data electrodes can achieve the improved effect of suppressing the electromagnetic wave, even if the number of the data electrodes simultaneously driven is the same.

It is apparent that the data driver IC of the present embodiment can also improve the display quality by performing PDP driving control using the high-blanking setting function of the data driver IC during the preliminary discharge period in a similar manner to that in the first embodiment.

In the second embodiment shown in FIG. 17, control operations are performed by using the signals at LBLK (R), LBLK(G) and LBLK (B) without using the signals at HBLK (R), HBLK(G) and HBLK (B). In this example, the signals LBLK (R), LBLK(G) and LBLK (B) correspond to the display cells of the three primary colors R, G and B respectively. However, it is not necessary that these signals correspond to the color of the display cells. The second embodiment is configured to suppress the electromagnetic emission by shifting the timing of application of the data pulse between adjacent electrodes. Therefore, it is possible to use, for example, four signals LBLK1, LBLK2, LBLK3 and LBLK4 that cyclically correspond to the display cells in order of their arrangement, irrespective of the color of the display cells. In such a configuration also, the timing of the application of the data pulse can be shifted between adjacent data electrodes.

Figure 19:
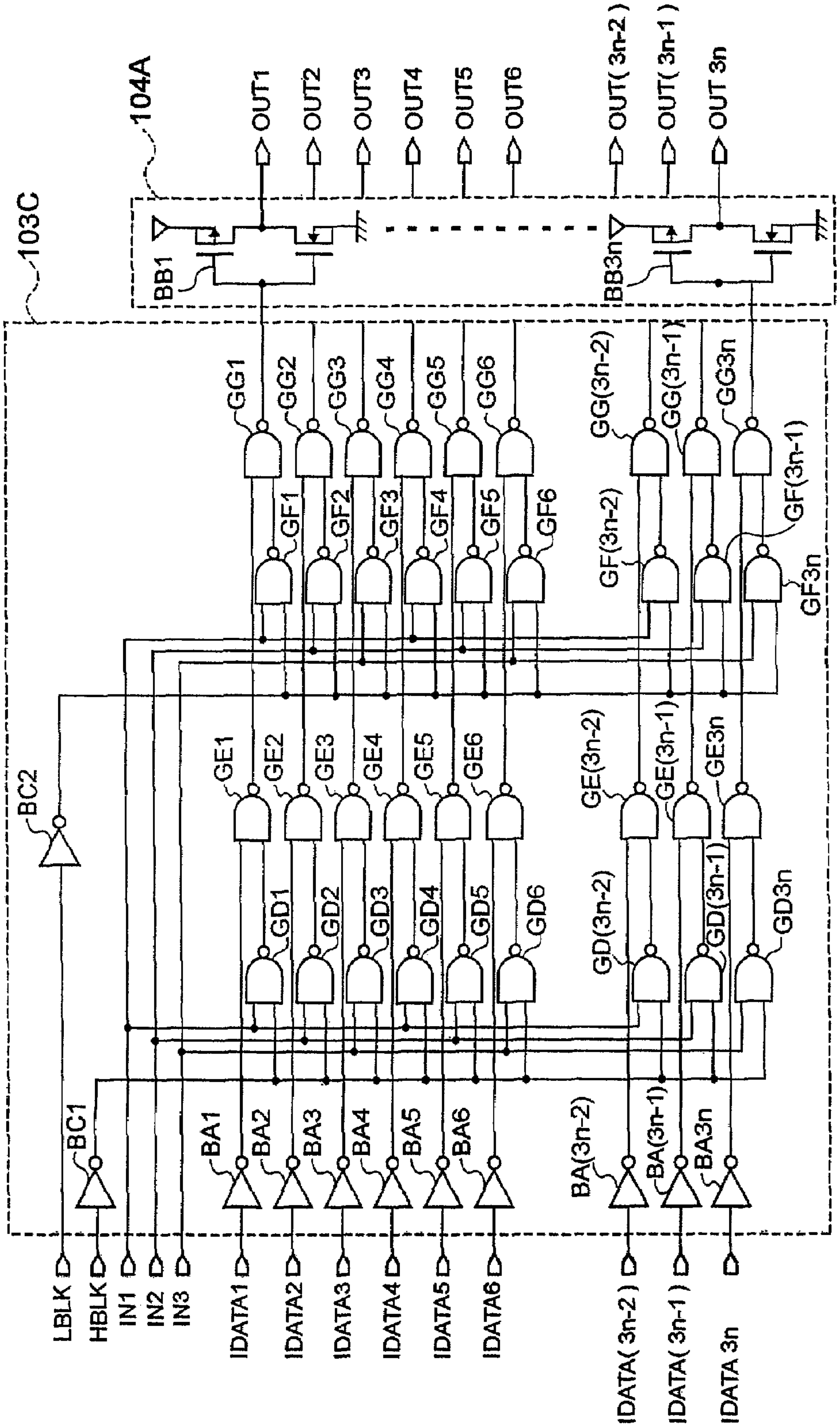
FIG. 19 is a circuit diagram of an output control circuit and a highly tolerant buffer in a PDP data driver IC according to a third embodiment of the present invention.
Figure 20:
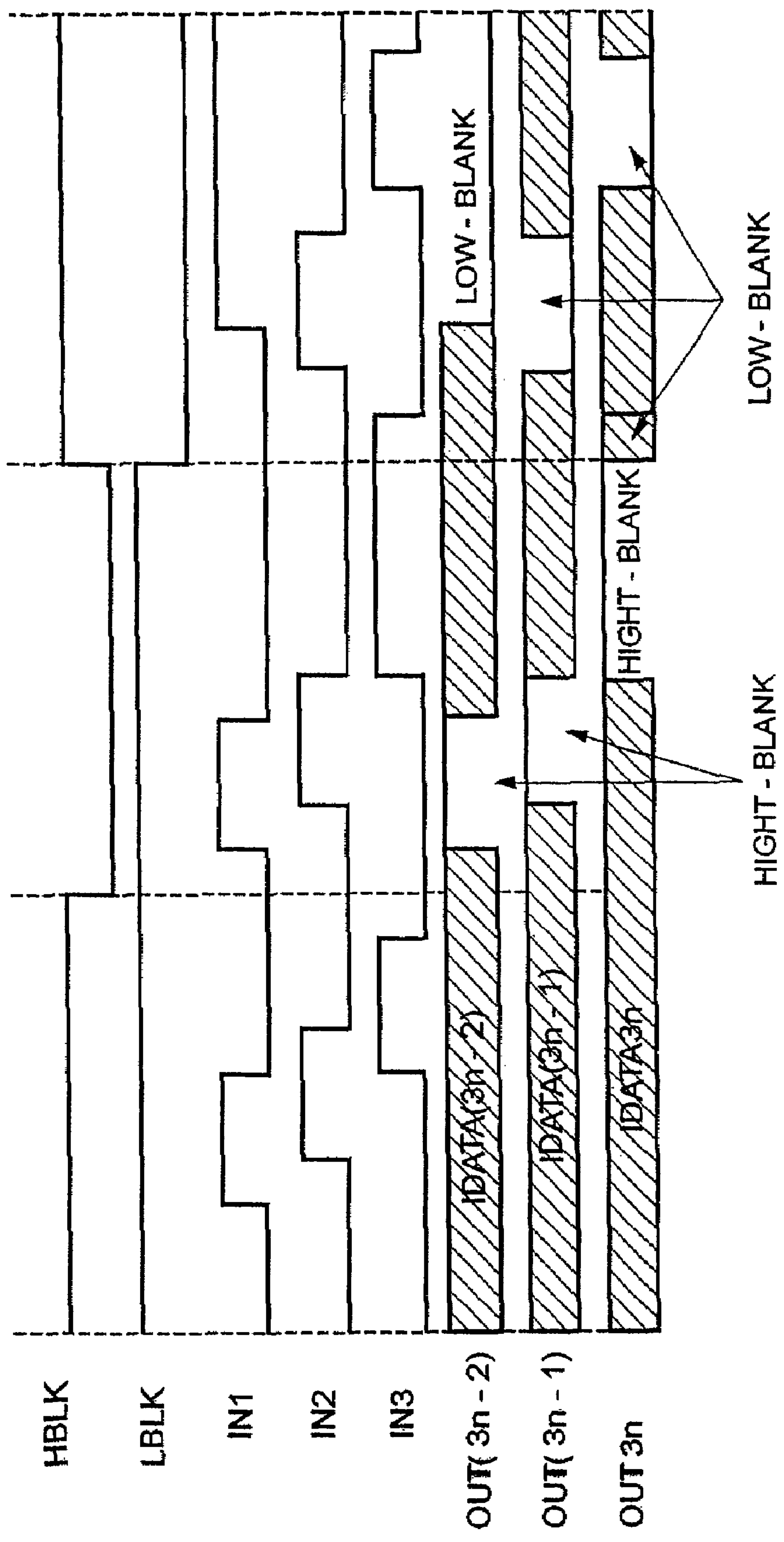
FIG. 20 is a timing chart showing operations of the output control circuit and the highly tolerant buffer in the PDP data driver IC in the third embodiment of the present invention.

FIG. 19 is a circuit diagram of an output control circuit and a highly tolerant buffer in the PDP data driver of a third embodiment of the present invention. FIG. 20 is a timing chart showing their operations.

The output control circuit 103C and the highly tolerant buffer 104A of the PDP data driver IC of the present embodiment have structures shown in FIG. 19.

The array of buffers BA1, BA2, BA3, . . . , BA(3n−2), BA(3n−1), and BA3n in the output control circuit 103C and the highly tolerant buffer 104A are the same as those in the first embodiment shown in FIG. 9.

All NAND gates forming an array of gates GD1, GD2, GD3, . . . , GD(3n−2), GD(3n−1), and GD3n are connected to an input terminal HBLK for selecting a state in which the high-blank state can be set, at one inputs through a buffer BC1. The other inputs of GD1, GD4, . . . , and GD(3n−2) are connected to a first blank timing adjustment input IN1. The other inputs of GD2, GD5, . . . , and GD(3n−1) are connected to a second blank timing adjustment input IN2. The other inputs of GD3, GD6, . . . , and GD3n are connected to a third blank timing adjustment input IN3.

All NAND gates forming an array of gates GE1, GE2, GE3, . . . , GE(3n−2), GE(3n−1), and GE3n are connected at one inputs to outputs of the buffers BA1, BA2, BA3, . . . , BA(3n−2), BA(3n−1), and BA3n provided in the former stage, and are connected at the other inputs to outputs of the gates GD1, GD2, GD3, . . . , GD(3n−2), GD(3n−1), and GD3n provided in the former stage, respectively.

All NAND gates forming an array of gates GF1, GF2, GF3, . . . , GF(3n−2), GF(3n−1), and GF3n are connected to an input terminal LBLK for selecting a state in which the low-blank state can be set, at one inputs through a buffer BC2. The other inputs of GF1, GF4, . . . , and GF(3n−2) are connected to the first blank timing adjustment input IN1. The other inputs of GF2, GF5, . . . , and GF(3n−1) are connected to the second blank timing adjustment input IN2. The other inputs of GF3, GF6, . . . , and GF3n are connected to the third blank timing adjustment input IN3.

All NAND gates forming an array of gates GG1, GG2, GG3, . . . , GG(3n−2), GG(3n−1), and GG3n are connected at one inputs to outputs of the gates GE1, GE2, GE3, . . . , GE(3n−2), GE(3n−1), and GE3n provided in the former stage, and are connected at the other inputs to outputs of the gates GF1, GF2, GF3, . . . , GF(3n−2), GF(3n−1), and GF3n provided in the former stage, respectively.

In the data driver IC of the present embodiment, output terminals are divided into three groups respectively represented by 3n−2, 3n−1, and 3n. The input terminals HBLK and LBLK are provided for selecting the state where the outputs of each of the three groups can be set to the high-blank state and the state where the outputs of each group can be set to the low-blank state, respectively. In addition, the blank timing adjustment inputs IN1, IN2, and IN3 respectively correspond to the three groups are provided. Due to that structure, blank timings of the outputs of each of the three groups can be adjusted independently.

As described above, the data driver IC of the present embodiment has the high-blank setting input and the low-blank setting input and also has the blank timing adjustment inputs the number of which is the same as the number of groups of the outputs of the data driver IC. Therefore, blank timings, i.e., timings of high-blank and timings of low-blank of the outputs can be independently adjusted for each group.

The circuit shown in FIG. 19 can select the state where high-blank can be set and the state where low-blank can be set by the HBLK input and LBLK input, respectively, as shown in the timing chart of FIG. 20. The HBLK input and the LBLK input are low active. When both the HBLK input and the LBLK input are high, display data IDATA1, IDATA2, IDATA3, . . . , IDATA(3n−2), IDATA(3n−1), and IDATA3n input from the latch circuit provided in the former stage of the circuit shown in FIG. 19 are output without change. Even if the HBLK input and the LBLK input are active (low), when the blank timing adjustment inputs IN1, IN2, and IN3 are non-active (low), the display data is output without change.

In order to set the high-blank state or the low-blank state, it is necessary to make the blank timing adjustment inputs IN1, IN2 and IN3 active (high) while the HBLK input or the LBLK input is active (low). Since the blank timing adjustment inputs IN1, IN2, and IN3 correspond to the output groups (3n−2), (3n−1), and 3n, respectively, blank timings of those three output groups can be adjusted by the blank timing adjustment inputs IN1, IN2, and IN3, respectively.

As described above, the data driver IC of the present embodiment can independently control high-blank timings and low-blank timings of each of the three output groups, although it cannot set the high-blank state and the low-blank state for different output groups at the same time.

It is apparent that the data driver IC of the present embodiment can also perform PDP driving control using the high-blanking setting function of the data driver IC in a similar manner to that in the first embodiment and PDP driving control using the high-blanking setting function and the low-blanking setting function of the data driver IC in a similar manner to that in the second embodiment.

Figure 21:
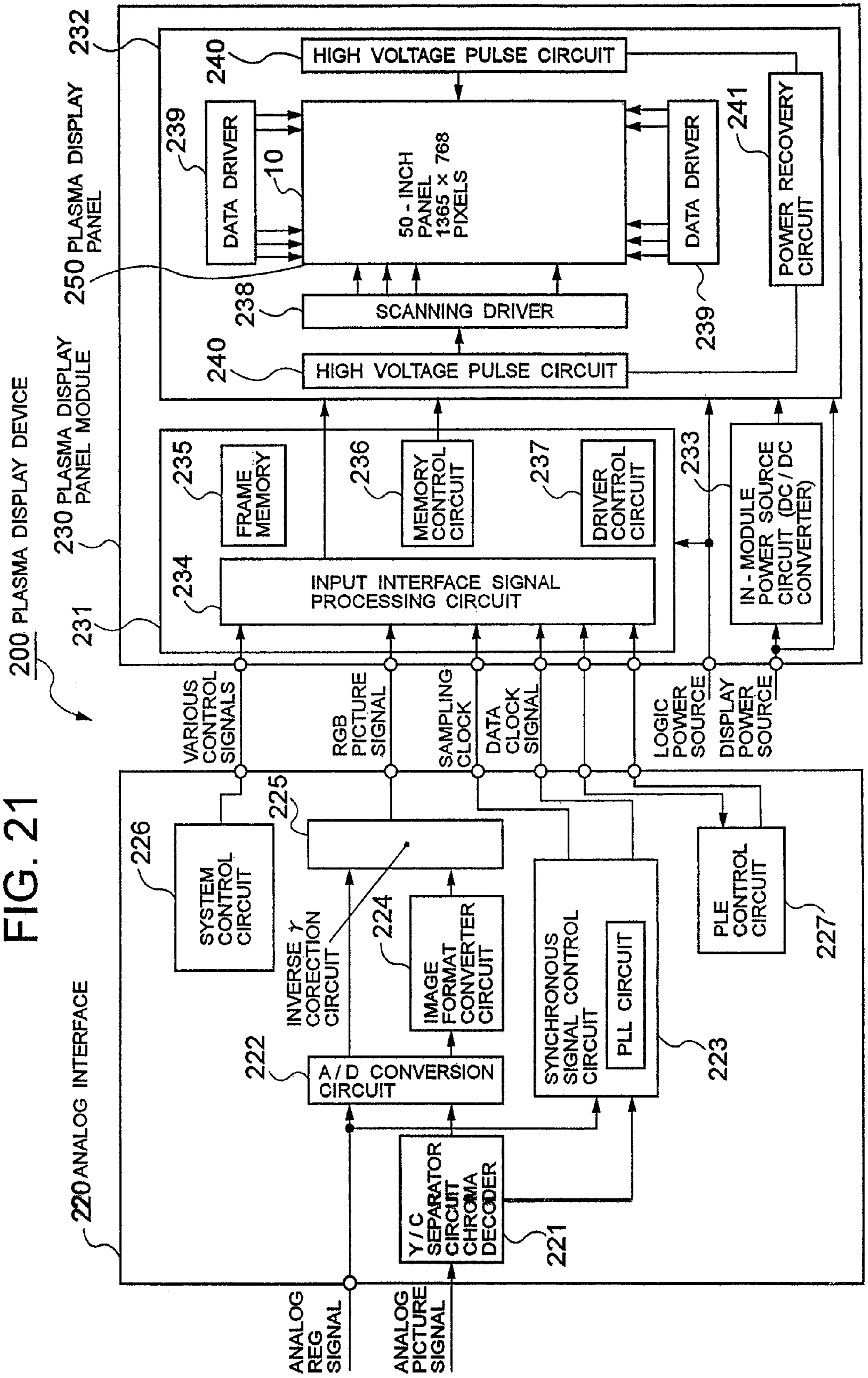
FIG. 21 is a block diagram showing the structure of a plasma display device according to a fourth embodiment of the present invention.

FIG. 21 is a block diagram showing the structure of a plasma display device according to a fourth embodiment of the present invention.

The plasma display device of the present embodiment has a feature that its data driver is formed by the data driver IC described in any one of the first to third embodiments.

The plasma display device 200 of the present embodiment has a module structure. More specifically, the plasma display device 200 includes an analog interface 220 and a plasma display panel module 230, as shown in FIG. 21. The plasma display panel module 230 includes a plasma display panel 250.

The analog interface 220 includes a Y/C separation circuit 221 including a chroma decoder, an A/D conversion circuit 222, a synchronous signal control circuit 223 including a PLL circuit, an image format conversion circuit 224, an inverse a τ correction circuit 225, a system control circuit 226, and a PLE control circuit 227.

The analog interface 220 generally has a function of converting a received analog picture signal into a digital signal and supplying the digital signal to the plasma display panel module 230.

For example, an analog picture signal transmitted from a TV tuner is separated into luminance signals of R, G, and B in the Y/C separation circuit 221. The luminance signals are then converted into digital signals in the A/C conversion circuit 222.

In the case where a pixel arrangement of the plasma display panel module 230 is different from a pixel arrangement of the picture signal, the image format conversion circuit 224 then performs a process for converting an image format that is required.

Display brightness characteristics with respect to an input signal in the plasma display panel are linear. However, correction in accordance with characteristics of a CRT (Cathode Ray Tube), i.e., τ correction is performed for a typical picture signal in advance.

Thus, after A/D conversion of the picture signal in the A/D conversion circuit 222, inverse τ correction is performed for the picture signal in the inverse τ correction circuit 225 so as to create a digital picture signal that is reconstituted to have linear characteristics. The thus created digital picture signal is output to the plasma display panel module 230 as an RGB picture signal.

Since the analog picture signal does not contain a sampling clock signal for A/D conversion and a data clock signal, the PLL (phase-locked loop) circuit included in the synchronous signal control circuit 223 generates the sampling clock signal and the data clock signal, using a horizontal synchronous signal supplied simultaneously with the analog picture signal, and supplies the thus generated clock signals to the plasma display panel module 230.

The PLE control circuit 227 of the analog interface 220 performs brightness control for the plasma display panel. More specifically, when an average brightness level is a predetermined level or lower, the PLE control circuit 227 performs control to increase the display brightness. When the average brightness level exceeds the predetermined level, the PLE control circuit 227 performs control to lower the display brightness.

The system control circuit 226 outputs various control signals to the plasma display panel module 230.

The plasma panel display module 230 further includes a digital signal processing and control circuit 231, a panel part 231, and an in-module power source circuit 233 that includes a DC/DC converter.

The digital signal processing and control circuit 231 includes an input interface signal processing circuit 234, a frame memory 235, a memory control circuit 236, and a driver control circuit 237.

For example, the average brightness level of the picture signal input to the input interface signal processing circuit 234 is calculated by a circuit for calculating that average brightness level (not shown) provided in the input interface signal processing circuit 234. The calculated average brightness level is output as 5-bit data, for example.

The PLE control circuit 227 sets PLE control data in accordance with the average brightness level and supplies that data to a brightness level control circuit (not shown) in the input interface signal processing circuit 234.

The digital signal processing and control circuit 231 processes the aforementioned various input signals in the input interface signal processing circuit 234 and sends a control signal to the panel part 232. At the same time, the memory control circuit 236 sends a memory control signal to the panel part 232 and the driver control circuit 237 sends a driver control signal to the panel part 232.

The panel part 232 includes the plasma display panel 250, a scanning driver 238 for driving scanning electrodes of the plasma display panel 250, a data driver 239 for driving data electrodes of the plasma display panel 250, a high-voltage pulse circuit 240 for supplying a pulse voltage to the plasma display panel 250 and the scanning driver 238, and a power recovery circuit 240 for recovering a surplus power from the high-voltage pulse circuit 240.

The plasma display panel 250 is formed to have 1365×768 pixels that are arranged, for example. A desired pixel of those pixels in the plasma display panel 250 is controlled to be turned on or off by controlling scanning electrodes and data electrodes by the scanning driver 238 and the data driver 239, respectively. In this manner, a desired image is displayed.

A logic power source supplies a logic power to the digital signal processing and control circuit 231 and the panel part 232. A display power source supplies a DC power to the in-module power source circuit 233 that converts a voltage of this DC power into a predetermined voltage and supplies the predetermined voltage to the panel part 232.

In the aforementioned plasma display device, the data driver 239 is formed by the data driver IC described in any one of the first to third embodiments and outputs of the data driver 239 are divided into three groups that correspond to R, G, and B, respectively. For each group of outputs, blanking control is performed in a manner that is described in detail in the above embodiment. Thus, the unique effects achieved by the above embodiment can be obtained without providing an independent data driver for each color and allowing for increase of the cost caused by making interconnection between the data driver and the PDP complicated.

When employing the data driver IC of the first embodiment, the high-blank state can be set for display data corresponding to each of R, G, and B independently of display data for other colors. Moreover, by using this function, duration of preliminary discharge between the data electrode and the scanning electrode during the preliminary discharge period is controlled for every color. Thus, preliminary discharge having appropriate duration in accordance with a difference of voltage characteristics between fluorescent materials for R, G, and B can be made to occur and therefore the display quality can be improved.

When employing the data driver IC of the second or third embodiment, the high-blank state and the low-blank state can be set for display data for each of R, G, and B independently of display data for other colors. Moreover, duration of opposed discharge between the data electrode and the scanning electrode during the preliminary discharge period is controlled for every color by using the high-blank setting function, thereby making preliminary discharge having appropriate duration in accordance with the difference of voltage characteristics between the fluorescent materials for R, G, and B occur. Therefore, the display quality can be improved. Furthermore, application timings of a data pulse can be made different between colors by using the low-blank setting function so as to suppress generation of an electromagnetic wave that causes a noise.

In the above description, the preferred embodiments of the present invention are described in detail with reference to the drawings. However, a specific structure is not limited to those embodiments. Those embodiments with modification or the like that does not depart from the summary of the present invention could fall within the scope of the present invention. For example, the gate array for setting the high-blank state and the gate array for setting the low-blank state may be arranged in a reversed order in each of the above embodiments. Moreover, the gates forming the gate array may be formed by gate devices other than NAND gates.

A PDP data driver, a method for driving a PDP, a plasma display device, and a method for controlling the plasma display device of the present invention can be applied not only to a plasma display panel and a plasma display device for TV but also to a plasma display panel and a plasma display device used as a display of any kind of a computer device, a control device, a measurement device, entertainment equipment, and other various devices.

This application is based on Japanese Patent Application No. 2004-217645 which is hereby incorporated by reference.

What is claimed is:

1. A PDP data driver for driving data electrodes of a PDP in accordance with display data, the data driver comprising a plurality of data driver ICs that are sequentially arranged; wherein each of the data driver ICs includes an output control circuit;

input and output terminals of the output control circuit are sequentially arranged in an order of display cells of a plurality of primary colors forming a screen of the PDP and divided into a plurality of groups corresponding to the plurality of primary colors, respectively;

the output control circuit includes a first array of gates and a second array of gates in such a manner that the gates of each of the first array and the second array correspond to the input and output terminals, respectively;

the output control circuit controls the first array of the gates to output input data without change or to set said input data to a high level in accordance with a first control input for a first group and to set a setting timing of the high level in accordance with a first timing adjustment input;

the output control circuit controls the second array of the gates to transfer outputs of the corresponding first array of the gates without change or to set said outputs to a low level in accordance with a second control input for the first group, and to set a setting timing of the low level in accordance with the first timing adjustment input;

the output control circuit controls the first array of the gates to output input data without change or to set said input data to the high level in accordance with the first control input for a second group, and to set the setting timing of the high level in accordance with a second timing adjustment input;

the output control circuit controls the second array of the gates to transfer outputs of the corresponding first array of the gates without change or to set said outputs to the low level in accordance with the second control input for the second group, and to set the setting timing of the low level in accordance with the second timing adjustment input;

the output control circuit controls the first array of the gates to output input data without change or to set said input data to the high level in accordance with the first control input for a third group, and to set the setting timing of the high level in accordance with a third timing adjustment input;

the output control circuit controls the second array of the gates to transfer outputs of the corresponding first array of the gates without change or to set said outputs to the low level in accordance with the second control input for the third group, and to set the setting timing of the low level in accordance with the third timing adjustment input.

2. The PDP data driver according to claim 1, wherein the plurality of primary colors forming the screen are red, green, and blue, and the plurality of groups are three groups corresponding to red, green, and blue, respectively.

3. A method for driving a PDP including the PDP data driver according to claim 1, the method comprising:

performing control to set data electrodes to be low by the PDP data driver at different timings between the plurality of groups while display data is input to the data electrodes during a writing discharge period of the PDP, thereby making application timings of a data pulse to the data electrodes different between the plurality of groups.

4. A method for driving a PDP including the PDP data driver according to claim 2, the method comprising:

performing control to set data electrodes to be low by the PDP data driver at different timings between the plurality of groups while display data is input to the data electrodes during a writing discharge period of the PDP, thereby making application timings of a data pulse to the data electrodes different between the plurality of groups.

5. A plasma display device comprising:

a PDP including a first substrate including a plurality of electrode pairs of a scanning electrode and a sustain electrode that are parallel to each other and a second substrate arranged to be opposed to the first substrate, the second substrate including a plurality of data electrodes arranged to intersect with the electrode pairs perpendicularly;

a digital signal processing circuit for processing digital image information obtained by performing format conversion for an analog picture signal, and outputting a signal for driving the PDP;

a control circuit; and a power source circuit, wherein the electrode pairs and the data electrodes are driven by driving circuits to make display cells formed between the first and second substrates at respective intersections of the electrode pairs and the data electrodes emit light, and the driving circuit for driving the data electrodes is formed by the PDP data driver according to any one of claims 1 and 2.

6. A plasma display device comprising:

a PDP including a first substrate including a plurality of electrode pairs of a scanning electrode and a sustain electrode that are parallel to each other and a second substrate arranged to be opposed to the first substrate, the second substrate having a plurality of data electrodes arranged to intersect with the electrode pairs perpendicularly;

a digital signal processing circuit for processing digital image information obtained by performing format conversion for an analog picture signal, and outputting a signal for driving the PDP;

a control circuit; and a power source circuit, wherein the electrode pairs and the data electrodes are driven by driving circuits to make display cells formed between the first and second substrates at respective intersections of the electrode pairs and the data electrodes emit light, and the PDP is driven by the driving method according to any one of claims 3 and 4.

* * * * *

UNITED STATES PATENT AND TRADEMARK OFFICE

CERTIFICATE OF CORRECTION

PATENT NO. : 7,710,372 B2
APPLICATION NO. : 11/188102
DATED : May 4, 2010
INVENTOR(S) : Hirakawa et al.

It is certified that error appears in the above-identified patent and that said Letters Patent is hereby corrected as shown below:

Title Page, in Section (73) “Assignees” on the front page of the above-identified patent, add --NEC Electronics Corporation, Kanagawa (JP)--.

Signed and Sealed this

Twenty-eighth Day of September, 2010

David J. Kappos
*Director of the United States Patent and Trademark Office*